(12) United States Patent
Jung et al.

(10) Patent No.: US 10,712,493 B2
(45) Date of Patent: Jul. 14, 2020

(54) DISPLAY APPARATUS

(71) Applicant: Samsung Display Co., Ltd., Gyeonggi-Do (KR)

(72) Inventors: Sangwoon Jung, Gyeonggi-Do (KR); Jee-na Lee, Gyeonggi-do (KR); Hyeonmi Lee, Gyeongsangnam-do (KR)

(73) Assignee: Samsung Display Co., Ltd. (KR)

( * ) Notice: Subject to any disclaimer, the term of this patent is extended or adjusted under 35 U.S.C. 154(b) by 168 days.

(21) Appl. No.: 15/657,482

(22) Filed: Jul. 24, 2017

(65) Prior Publication Data
US 2018/0106960 A1 Apr. 19, 2018

(30) Foreign Application Priority Data
Oct. 19, 2016 (KR) .................... 10-2016-0136012

(51) Int. Cl.
*G02B 6/00* (2006.01)
*F21V 8/00* (2006.01)

(52) U.S. Cl.
CPC .......... *G02B 6/0088* (2013.01); *G02B 6/0051* (2013.01); *G02B 6/0053* (2013.01); *G02B 6/0056* (2013.01)

(58) Field of Classification Search
CPC .... G02B 6/002; G02B 6/0028; G02B 6/0045; G02B 6/0048; G02B 6/0046; G02B 6/0056; G02B 6/0053; G02B 6/0051; G02B 6/0086; G02B 6/0088; G02B 6/0095; G02F 2001/133322; G02F 2001/133317; G02F 1/133308; G02F 2001/133354
See application file for complete search history.

(56) References Cited

U.S. PATENT DOCUMENTS

| | | |
|---|---|---|
| 2004/0257791 A1 | 12/2004 | Chen et al. |
| 2006/0147175 A1 | 7/2006 | Shinohara |
| 2007/0230218 A1 | 10/2007 | Jachim et al. |

(Continued)

FOREIGN PATENT DOCUMENTS

| | | |
|---|---|---|
| JP | 2011186179 A | 9/2011 |
| JP | 2014-082173 A | 5/2014 |

(Continued)

OTHER PUBLICATIONS

European Search Report corresponding to EP Application No. 17197255.7, dated Apr. 10, 2018, 7 pages.

*Primary Examiner* — Y M. Quach Lee
(74) *Attorney, Agent, or Firm* — Innovation Counsel LLP

(57) ABSTRACT

A display apparatus includes a light source generating a light, a display panel receiving the light from the light source and including a display area displaying an image and a non-display area disposed adjacent to the display area, and first and second optical sheets disposed under the display panel. Each of the first and second optical sheets includes a body portion overlapped with the display area and a wing portion connected to one side portion of the body portion in the first direction to overlap with a portion of the non-display area. A length of the wing portion of the first optical sheet in the second direction is shorter than a length of the wing portion of the second optical sheet in the second direction, and the wing portion of the first optical sheet is entirely overlapped with the wing portion of the second optical sheet.

22 Claims, 26 Drawing Sheets

(56) References Cited

U.S. PATENT DOCUMENTS

| | | | |
|---|---|---|---|
| 2008/0088767 A1 | 4/2008 | Chen et al. | |
| 2012/0050635 A1 | 3/2012 | Yoo et al. | |
| 2016/0109635 A1 | 4/2016 | Lee et al. | |
| 2017/0371094 A1* | 12/2017 | Lee | G02B 6/0088 |

FOREIGN PATENT DOCUMENTS

| | | | |
|---|---|---|---|
| KR | 10-1998-0015705 A | 5/1998 | |
| KR | 10-2005-0049196 A | 5/2005 | |
| KR | 20060080546 A | 7/2006 | |
| KR | 10-2007-0061449 A | 6/2007 | |
| KR | 10-2008-0067867 A | 7/2008 | |
| KR | 20120019139 A | 3/2012 | |
| KR | 20150062796 A | 6/2015 | |

* cited by examiner

DISPLAY APPARATUS

CROSS-REFERENCE TO RELATED APPLICATION

This U.S. non-provisional patent application claims priority under 35 U.S.C. § 119 to Korean Patent Application No. 10-2016-0136012, filed on Oct. 19, 2016, the contents of which are hereby incorporated by reference in its entirety.

BACKGROUND

1. Field of Disclosure

The present disclosure relates to a display apparatus. More particularly, the present disclosure relates to a display apparatus capable of improving assemblability of optical members.

2. Description of the Related Art

Electronic devices, such as a mobile communication terminal, a digital camera, a notebook, a monitor, a television set, etc., include a display apparatus to display an image.

In general, the display apparatus includes a display panel displaying the image, an optical sheet providing a light to the display panel after diffusing and condensing the light, and a backlight unit generating the light.

The display panel controls a transmittance of the light provided from the backlight unit to display a desired image. The optical sheet includes a prism sheet, a diffusion sheet, and a protective sheet. The prism sheet condenses the light exiting from a light guide plate of the backlight unit, and the diffusion sheet diffuses the light condensed by the prism sheet. The protective sheet protects the prism sheet from external friction.

SUMMARY

The present disclosure provides a display apparatus capable of improving assemblability of optical members.

Embodiments of the inventive concept provide a display apparatus including a light source generating a light, a display panel receiving the light from the light source and including a display area displaying an image and a non-display area disposed adjacent to the display area, the display area and the non-display area being defined on a plane surface defined by a first direction and a second direction crossing the first direction, and a first optical sheet and a second optical sheet disposed under the display panel. Each of the first optical sheet and the second optical sheet includes a body portion overlapped with the display area and a wing portion connected to one side portion of the body portion in the first direction to overlap with a portion of the non-display area. A length of the wing portion of the first optical sheet in the second direction is shorter than a length of the wing portion of the second optical sheet in the second direction, and the wing portion of the first optical sheet is entirely overlapped with the wing portion of the second optical sheet.

The display apparatus further includes a light guide plate disposed under the first optical sheet and the second optical sheet.

The second optical sheet is disposed between the display panel and the first optical sheet.

The light guide plate includes a light guide portion overlapped with the display area and an assembling portion connected to one side surface of the light guide portion in the first direction. The assembling portion includes a first assembly connected to the one side surface of the light guide portion and a second assembly disposed above the first assembly and having a length shorter than a length of the first assembly in the second direction to expose at least a portion of an upper surface of the first assembly.

The light guide portion includes a light exit surface making contact with a lower surface of the body portion of the first optical sheet, a bottom surface facing the light exit surface, and a plurality of side surfaces connecting the light exit surface and the bottom surface. The side surfaces include a light incident surface facing the light source to receive the light from the light source, an opposite surface facing the light incident surface, a first side surface connecting the light incident surface and the light exit surface, and a second side surface connecting the light incident surface and the light exit surface, and the first assembly is connected to at least one of the opposite surface, the first side surface, or the second side surface.

The display apparatus further includes a third optical sheet disposed between the display panel and the second optical sheet. The assembling portion further includes a third assembly disposed on the second assembly and has a length shorter than the length of the second assembly in the second direction, and a portion of an upper surface of the second assembly is exposed by the third assembly.

The portion of the upper surface of the first assembly is defined as a first support surface, the wing portion of the first optical sheet covers the first support surface, the portion of the upper surface of the second assembly is defined as a second support surface, the wing portion of the second optical sheet covers the second support surface and an upper surface of the wing portion of the first optical sheet, and the wing portion of the third optical sheet covers an upper surface of the third assembly and an upper surface of the wing portion of the second optical sheet.

The upper surface of the first assembly is disposed on a same plane surface as an upper surface of the light guide portion.

The display apparatus further includes a first adhesive member disposed on the first support surface to fix the first optical sheet to the first assembly, a second adhesive member disposed on the second support surface to fix the second optical sheet to the second assembly, and a third adhesive member disposed on the third support surface to fix the third optical sheet to the third assembly.

A plane surface defined by the first support surface has a step difference with respect to a plane surface defined by the upper surface of the light guide portion, and the step difference is equal to a thickness of the first adhesive member.

The light guide plate includes a light guide portion overlapped with the display area and an assembling portion connected to one side surface of the light guide portion in the first direction, and an upper surface of the assembling portion is inclined along the second direction.

The display apparatus further includes a fourth adhesive member disposed on the inclined upper surface of the assembling portion. The fourth adhesive member fixes a lower surface of the wing portion of the first optical sheet and a lower surface of the wing portion of the second optical sheet to the inclined upper surface of the assembling portion.

The display apparatus further includes an adhesive structure coupling the first optical sheet and the second optical sheet to the light guide plate. The light guide plate includes a light guide portion overlapped with the display area and an assembling portion connected to one side surface of the light guide portion in the first direction. The adhesive structure includes a first base body disposed on an upper surface of the assembling portion and a second base body disposed on the first base body and having a length shorter than a length of the first base body in the second direction to expose at least a portion of an upper surface of the first base body.

The display apparatus further includes a mold frame disposed under the first optical sheet and the second optical sheet and overlapped with the non-display area. The mold frame includes a first bottom mold substantially parallel to the plane surface defined by the first and second directions and having a frame shape, a second bottom mold disposed at one end portion of the first bottom mold in the first direction and having a length shorter than a length of the one side portion of the first bottom mold in the second direction, and a sidewall mold extending upwardly to cover side surfaces of the first optical sheet and the second optical sheet, and a portion of an upper surface of the first bottom mold is exposed by the second bottom mold.

The first optical sheet is disposed between the mold frame and the second optical sheet, a lower surface of the wing portion of the first optical sheet makes contact with the portion of the upper surface of the first bottom mold, and the wing portion of the second optical sheet makes contact with an upper surface of the wing portion of the first optical sheet and an upper surface of the second bottom mold.

The first optical sheet is disposed between the display panel and the second optical sheet.

The display apparatus further includes a mold frame disposed between the display panel and the first optical sheet and having a frame shape overlapped with the non-display area. The mold frame includes a first bottom mold extending parallel to the plane surface defined by the first direction and the second direction, a second bottom mold disposed under one end portion of the first bottom mold in the first direction and having a length shorter than a length of the one side portion of the first bottom mold in the second direction, and a sidewall mold extending downwardly to cover side surfaces of the first optical sheet and the second optical sheet, and a portion of a lower surface of the first bottom mold is exposed by the second bottom mold.

An upper surface of the wing portion of the first optical sheet makes contact with the portion of the lower surface of the first bottom mold, and the wing portion of the second optical sheet makes contact with a lower surface of the wing portion of the first optical sheet and a lower surface of the second bottom mold.

The display apparatus further includes a light guide plate disposed between the display panel and the first and second optical sheets. The light guide plate includes a light guide portion overlapped with the display area and an assembling portion connected to one side surface of the light guide portion in the first direction. The assembling portion includes a first assembly connected to the one side surface of the light guide portion and a second assembly disposed under the first assembly and having a length shorter than a length of the first assembly in the second direction to expose at least a portion of a lower surface of the first assembly.

At least one of the first optical sheet and the second sheet includes a reflective material.

The display apparatus further includes a third optical sheet disposed under the first optical sheet and the second optical sheet. The third optical sheet includes a third body portion overlapped with the display area; and a third wing portion overlapped with the portion of the non-display area. The third wing portion includes a first base body connected to one side surface of the third body portion and a second base body disposed on the first base body and having a length shorter than a length of the first base body to expose at least a portion of an upper surface of the first base body.

The light source includes a plurality of light source units disposed under the third optical sheet, and the light source units are arranged in a matrix form on the plane surface defined by the first and second directions.

Embodiments of the inventive concept provide a display apparatus including a light source generating a light, a display panel including a display area displaying an image and a non-display area surrounding the display area, a first optical sheet disposed under the display panel, and a second optical sheet disposed between the first optical sheet and the display panel. Each of the first and second optical sheets includes a body portion overlapped with the display area and a plurality of wing portions respectively connected to two or more outer side portions of the body portion to overlap with a portion of the non-display area. A length of portions, in which each of the wing portions of the first optical sheet is connected to the body portion of the first optical sheet, is shorter than a length of portions in which each of the wing portions of the second optical sheet is connected to the body portion of the second optical sheet. The wing portions of the first optical sheets are entirely overlapped with the wing portions of the second optical sheets, respectively.

The display apparatus further includes a light guide plate disposed under the first optical sheet. The light guide plate includes a light guide portion overlapped with the display area and a plurality of assembling portions connected to at least two side surfaces of side surfaces of the light guide portion. Each of the assembling portions includes a first assembly connected to one side surface of the light guide portion and a second assembly connected to the one side surface of the light guide portion and disposed on the first assembly and having a length shorter than a length of the first assembly, a portion of an upper surface of the first assemblies is exposed by the second assemblies, a lower surface of each of the wing portions of the first optical sheet makes contact with the portion of the upper surface of the first assembly, and a lower surface of each of the wing portions of the second optical sheet covers an upper surface of the wing portion of the first optical sheet and an upper surface of the second assembly.

The light guide plate includes a light exit surface making contact with a lower surface of the body portion of the first optical sheet, a bottom surface facing the light exit surface, and a plurality of side surfaces connecting the light exit surface and the bottom surface. The side surfaces include a light incident surface on which the light source is arranged, an opposite surface facing the light incident surface, a first side surface connecting the light incident surface and the light exit surface, and a second side surface connecting the light incident surface and the light exit surface to face the first side surface. Each of the first assemblies is connected to at least one of the opposite surface, the first side surface, and the second side surface.

According to the above, the assemblability of the optical sheets may be improved. In addition, the display quality of the display apparatus may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
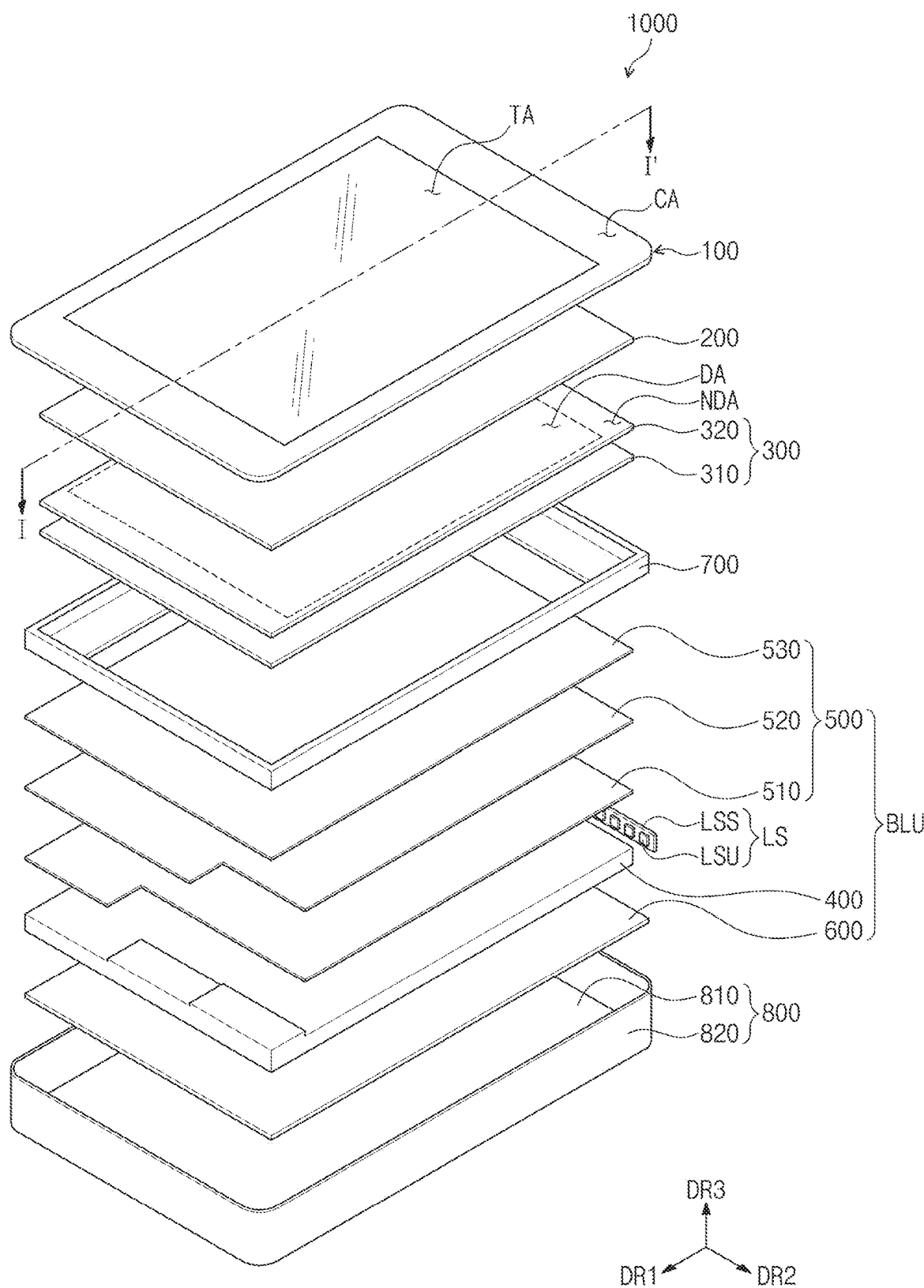
FIG. 1 is an exploded perspective view showing a display apparatus according to an exemplary embodiment of the present disclosure.

Hereinafter, exemplary embodiments of the present inventive concept will be explained in detail with reference to the accompanying drawings. The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully convey the concept of the inventive concept to those skilled in the art, and the present disclosure will only be defined by the appended claims. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Embodiments described in the disclosure are described with reference to plan views and cross-sectional views that are ideal schematic diagrams. Accordingly, shapes of the exemplary views may vary depending on manufacturing technologies and/or tolerances. Thus, embodiments are not limited to shown specific forms and also include variations in form produced according to manufacturing processes. Therefore, regions illustrated in the drawings are exemplary, and the shapes of the regions illustrated in the drawings are intended to illustrate the specific shapes of the regions of elements and not to limit the scope of the present disclosure.

Hereinafter, the present inventive concept will be explained in detail with reference to the accompanying drawings.

Figure 2:
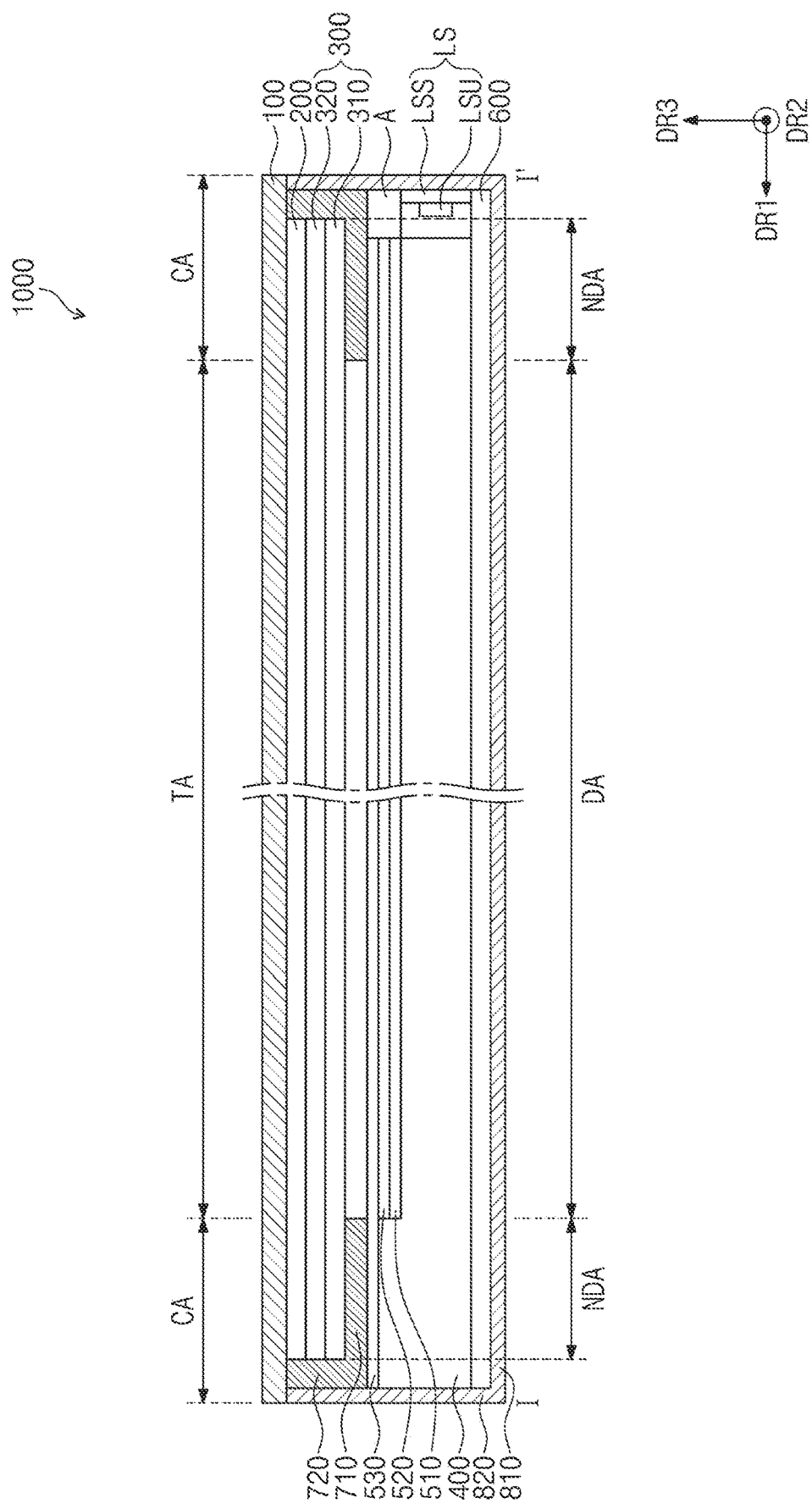
FIG. 2 is a cross-sectional view taken along a line I-I' shown in FIG. 1.

FIG. 1 is an exploded perspective view showing a display apparatus 1000 according to an exemplary embodiment of the present disclosure, and FIG. 2 is a cross-sectional view taken along a line I-I' shown in FIG. 1.

Referring to FIGS. 1 and 2, the display apparatus 1000 has a rectangular shape which includes long sides extending in a first direction DR1 and short sides extending in a second direction DR2, however, the display apparatus 1000 may have a variety of shapes according to other embodiments.

The display apparatus 1000 includes a window member 100, a polarizing layer 200, a display panel 300, a backlight unit BLU, a mold frame 700, and an accommodating member 800.

For the convenience of explanation, a direction in which an image is displayed in the display apparatus 1000 is referred to as an upper direction and a direction opposite to the upper direction is referred to as a lower direction. In the present exemplary embodiment, the upper and lower directions are substantially parallel to a third direction DR3 perpendicular to the first direction DR1 and the second direction DR2. The third direction DR3 may be a reference direction to distinguish a front surface from a rear surface of the following components of the display apparatus 1000. However, the upper direction and the lower direction are relative concepts to each other, and thus the upper direction and the lower direction may be changed to other directions.

The window member 100 includes a light transmission area TA transmitting an image provided from the polarizing layer 200 and the display panel 300 and a light block area CA disposed adjacent to the light transmission area TA and not transmitting the image. The light transmission area TA is disposed at a center of the display apparatus 1000 in a plane surface defined by the first direction DR1 and the second direction DR2. The light block area CA is disposed in the vicinity of the light transmission area TA and has a frame shape surrounding the light transmission area TA.

According to another embodiment of the present disclosure, the window member 100 of the display apparatus 1000 may include only the light transmission area TA. That is, the light block area CA may be omitted. In this case, the image may be provided through the entire area of an upper surface of the window member 100.

The window member 100 may include a glass, sapphire, or plastic material.

The display panel 300 is disposed under the window member 100.

In the plane surface, a display area DA through which the image is displayed and a non-display area NDA through which the image is not displayed are defined in the display panel 300. The display area DA is defined at a center of the display panel 300 and overlapped with the light transmission area TA of the window member 100 when viewed in a plan view. The non-display area NDA is defined to surround the display area DA and overlapped with the light block area CA of the window member 100.

The display panel 300 includes a display substrate 310 and an opposite substrate 320. The display panel 300 has a structure in which the display substrate 310 is coupled to the opposite substrate 320.

The display substrate 310 includes a plurality of pixels (not shown) arranged in the display area DA. The pixels (not shown) display the image in response to electrical signals applied thereto.

A type of the display panel 300 is determined depending on the configuration of the pixels of the display substrate 310. The display panel 300 may be a light-receiving type display panel. For instance, the display panel 300 may be a liquid crystal display panel. That is, the display panel 300 may include a liquid crystal layer (not shown). However, the display panel 300 may be an electrowetting display panel, an electrophoretic display panel, or a microelectromechanical system (MEMS) display panel according to embodiments.

The opposite substrate 320 may serve as an encapsulation substrate to encapsulate the display substrate 310, but the function of the opposite substrate 320 should not be limited thereto or thereby. For instance, the opposite substrate 320 may perform a touch function according to another embodiment. In addition, the opposite substrate 320 may be omitted according to another embodiment.

The polarizing layer 200 is disposed between the window member 100 and the display panel 300, but it should not be limited thereto or thereby. According to another embodiment, the polarizing layer 200 may be arranged inside the display panel 300. In detail, the polarizing layer 200 according to another embodiment may be an in-cell polarizing layer disposed between the display substrate 310 and the opposite substrate 320.

The polarizing layer 200 selectively absorbs or transmits a light incident to the polarizing layer 200. The polarizing layer 200 may have an optical axis (not shown) in a predetermined direction.

The backlight unit BLU is disposed under the display panel 300 to provide the light to the display panel 300. According to the present exemplary embodiment, the backlight unit BLU may be, but not limited to, an edge-illumination type backlight unit.

The backlight unit BLU includes a light source LS, a light guide plate 400, a plurality of optical sheets 500, and a reflective sheet 600.

The light source LS is disposed to face at least one side surface among side surfaces of the light guide plate 400 in the first direction DR1. The light source LS includes a plurality of light source units LSU and a light source substrate LSS. The light source units LSU generate the light, which is to be provided to the display panel 300, and provide the light to the light guide plate 400. According to the present exemplary embodiment, the light source units LSU may include a light emitting diode (LED) as a point light source, but they should not be limited thereto or thereby. That is, according to another embodiment, the light source units LSU may include an ultraviolet lamp or a laser diode. In addition, according to another embodiment, one LED or a plurality of LED groups may be employed as the light source units LSU. Further, according to another embodiment, the light source units LSU may be a linear light source.

The light source units LSU may be mounted on the light source substrate LSS. The light source substrate LSS is disposed to face the one side surface among the side surface of the light guide plate 400 and extends in the second direction DR2. A wiring line may be printed on the light source substrate LSS to provide and control a power to the light source units LSU. The light source substrate LSS may include a light source controller (not shown) connected to the light source units LSU. The light source controller (not shown) analyzes the image displayed through the display panel 300 to output a local dimming signal and controls a brightness of the light generated by the light source units LSU in response to the local dimming signal. According to another embodiment of the present disclosure, the light source controller (not shown) may be mounted on a separate circuit board, and a position of the light source controller should not be limited to a specific position.

The light guide plate 400 is disposed under the display panel 300. The light guide plate 400 changes a path, in which the light provided from the light source LS travels, to the upper direction in which the display panel 300 is disposed.

The light guide plate 400 may include a plurality of patterns (not shown) arranged on a lower surface or an upper surface of the light guide plate 400. The patterns (not shown) may have a convex shape or a triangular shape. The patterns (not shown) reflect or condense the light incident to the light guide plate 400. The light provided to the light guide plate 400 from the light source LS is scattered or reflected by the patterns (not shown) and then travels to the upper direction of the light guide plate 400 after exiting from the light guide plate 400.

The light guide plate 400 includes a material having high light transmittance in a visible light area. As an example, the light guide plate 400 may include a transparent polymer resin, e.g., polycarbonate (PC), polymethylmethacrylate (PMMA), etc.

A plurality of optical sheets 500 is disposed between the light guide plate 400 and the display panel 300. The light provided to the optical sheets 500 from the light guide plate 400 is diffused or condensed by the optical sheets 500 and provided to the display panel 300.

According to the present exemplary embodiment, the optical sheets 500 include a first optical sheet 510, a second optical sheet 520, and a third optical sheet 530. The first optical sheet 510 is disposed between the light guide plate 400 and the second optical sheet 520, the second optical sheet 520 is disposed between the first optical sheet 510 and the third optical sheet 530. The second optical sheet is disposed between the display panel and first optical sheet. In the present exemplary embodiment, three optical sheets will be described, but the number of the optical sheets 500 should not be limited to three.

The optical sheets 500 have different functions from each other. The first optical sheet 510 may be, but not limited to, a diffusion sheet. The first optical sheet 510 diffuses the light provided from the light guide plate 400. The second optical sheet 520 may be, but not limited to, a prism sheet. The second optical sheet 520 may condense the light diffused by the first optical sheet 510 in the upper direction substantially perpendicular to the plane surface.

In addition, the third optical sheet 530 may be, but not limited to, a protective sheet. The third optical sheet 530 may protect prisms of the second optical sheet 520 from the external friction.

However, the optical sheets should not be limited thereto. For instance, according to another embodiment, the third optical sheet 530 may be the prism sheet. That is, the optical sheets 500 may include plural prism sheets. In addition, the optical sheets 500 may further include sheets having other functions in addition to the diffusion, condensing, and protection.

The optical sheets 500 will be described in detail with reference to FIGS. 3 and 4.

The reflective sheet 600 is disposed under the light guide plate 400. The reflective sheet 600 reflects the light traveling downward from the light guide plate 400. The reflective sheet 600 includes a material reflecting the light. For instance, the reflective sheet 600 may include aluminum.

The mold frame 700 is disposed above the optical sheets 500. The mold frame 700 has a frame shape. In detail, the mold frame 700 may be disposed to overlap with the non-display area NDA when viewed in a plan view and to correspond to an edge area of the light guide plate 400. The mold frame 700 fixes the polarizing layer 200, the display panel 300, and the backlight unit BLU. The mold frame 700 may be omitted according to embodiments.

The mold frame 700 includes a bottom mold 710 and a sidewall mold 720. The bottom mold 710 is disposed between the optical sheets 500 and the display panel 300 to separate the optical sheets 500 from the display panel 300. The bottom mold 710 has a frame shape substantially parallel to the plane surface defined by the first and second directions DR1 and DR2. The polarizing layer 200 and the display panel 300 may be placed on an upper surface of the bottom mold 710. The bottom mold 710 may be overlapped with the non-display area NDA.

The sidewall mold 720 has a shape bent from an outer side of the bottom mold 710 and extending upwardly. The sidewall mold 720 may cover side surfaces of the polarizing layer 200 and the display panel 300.

The accommodating member 800 is disposed at a lower-most position of the display apparatus 1000 to accommodate the backlight unit BLU. The accommodating member 800 includes a bottom portion 810 and a plurality of sidewall portions 820 connected to the bottom portion 810. In the present exemplary embodiment, the light source LS may be disposed on an inner side surface of one sidewall portion among the sidewall portions.

The display apparatus 1000 may further include a light blocking member A. The light blocking member A may be disposed in a space defined by the light source LS, a lower surface of the mold frame 700, and the side surfaces of the optical sheets 500. The light blocking member A absorbs the light provided from the light source LS, which travels in the upper direction without being incident to the light guide plate 400. Accordingly, the light blocking member A may prevent the light from the light source LS from being provided to the side surfaces of the optical sheets 500.

In addition, according to another embodiment, the light blocking member A may perform a heat discharge function. In this case, the light blocking member A may prevent the damage of the display apparatus 1000, which is caused by the heat generated from the light source LS.

Figure 3:
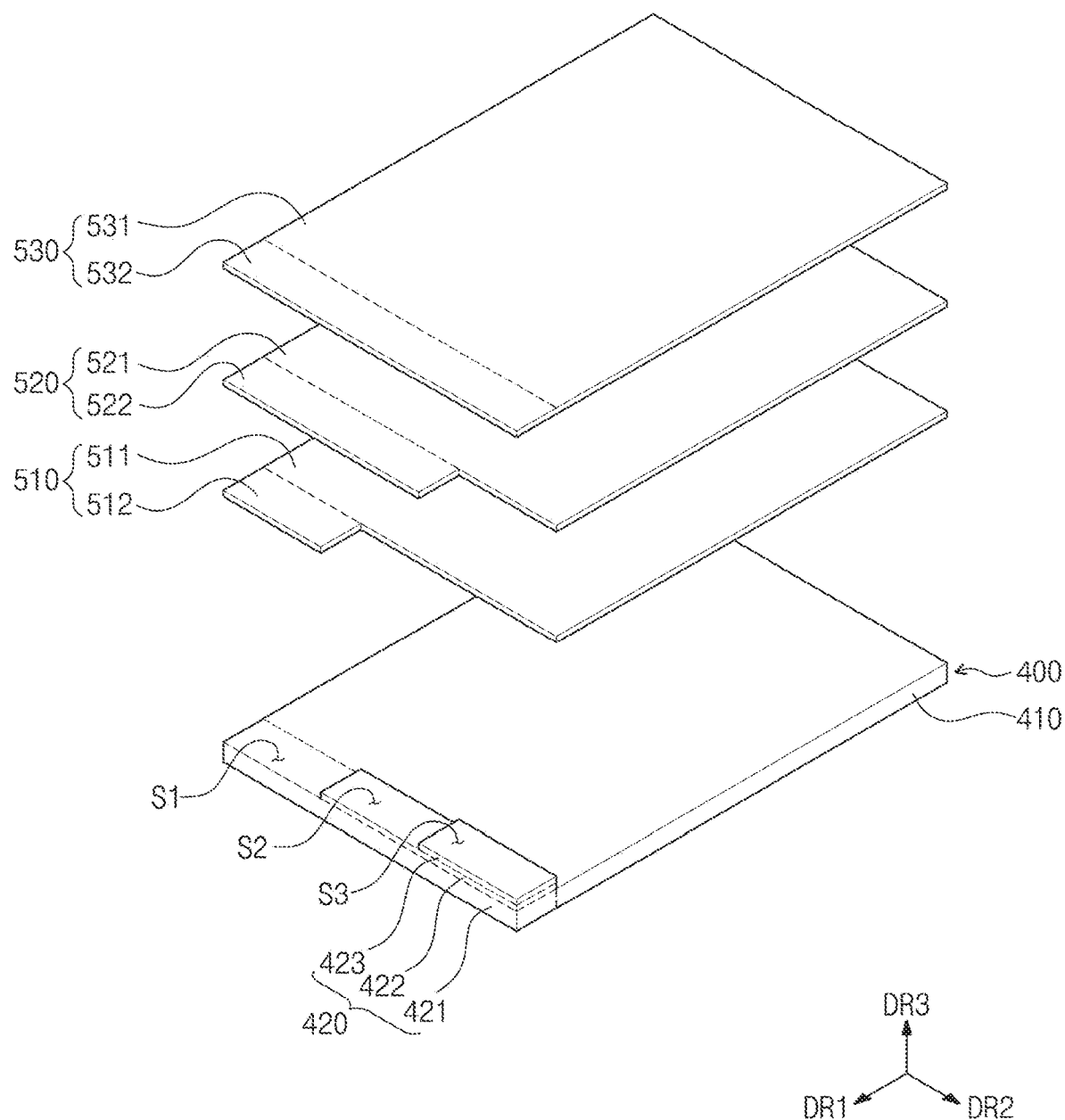
FIG. 3 is an enlarged perspective view showing optical sheets and a light guide plate shown in FIG. 1.
Figure 4:
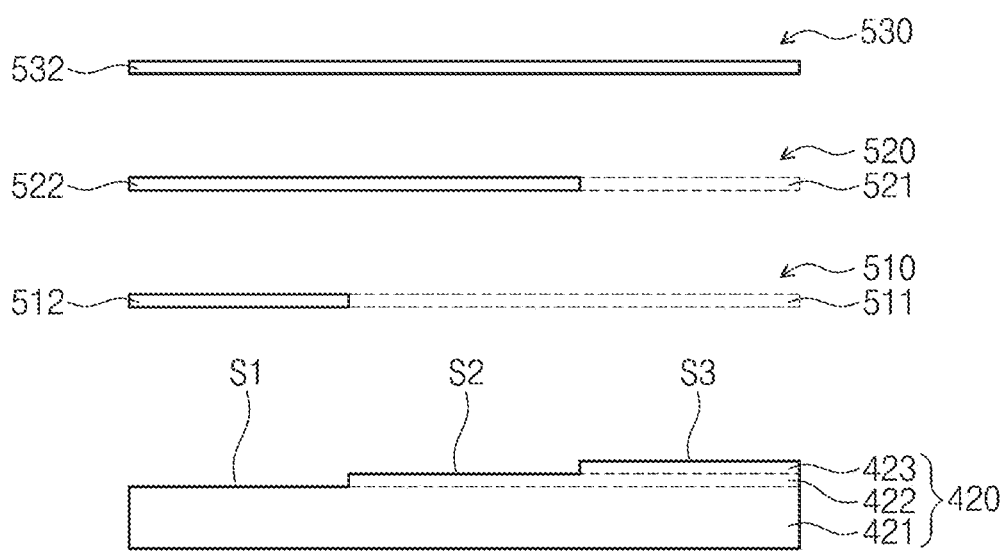
FIG. 4 is a cross-sectional view showing the optical sheets and the light guide plate shown in FIG. 3.
Figure 4:
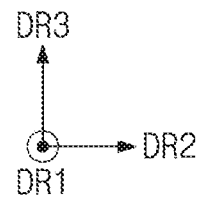

FIG. 3 is an enlarged perspective view showing the optical sheets 500 and the light guide plate 400 shown in FIG. 1, and FIG. 4 is a cross-sectional view showing the optical sheets 500 and the light guide plate 400 shown in FIG. 3.

Referring to FIGS. 3 and 4, the light guide plate 400 includes a light guide portion 410 and an assembling portion 420. The light guide plate 400 has a plate-like shape. At least a portion of the light guide plate 400 may be entirely overlapped with the display area DA.

The assembling portion 420 is connected to one side surface of the light guide portion 410 in the first direction DR1. The light source LS is not disposed on the one side surface. For instance, the light source LS may be disposed at the other side portion of the light guide portion 410 in the first direction DR1 to face the other side surface of the light guide portion 410. Accordingly, although an optical path of the light provided to the light guide portion 410 is changed by the assembling portion 420, the light provided to the light guide portion 410 in the display area DA may be guided to the upper direction since the optical path is changed only in the non-display area NDA.

According to the present exemplary embodiment, the light source LS may face the light guide plate 400 to a region opposite to the assembling portion 420 such that the light guide portion 410 is disposed between the light source LS and the assembling portion 420. That is, the light source LS may be disposed adjacent to the other side surface of the light guide portion 410 which opposes the assembling portion 420 in the first direction DR1, but it should not be limited thereby or thereto. That is, the light source LS may be disposed one of the side surfaces of the light guide portion 410 except for the one side surface on which the assembling portion 420 is disposed.

The light guide portion may comprise a light exit surface, a bottom surface and plurality of side surfaces. The light exit surface may make contact with a lower surface of the optical sheet. The bottom surface may face the light exit surface. The side surfaces may connect the light exit surface and the bottom surface.

The side surfaces may comprise a light incident surface, an opposite surface, first side surface and a second side surface. The light incident surface may face the light source to receive the light from the light source LS. The opposite surface may face the light incident surface. The first side surface may connect the light incident surface and the light exit surface. The second side surface may connect the light incident surface and the light exit surface, and facing the first side surface. The first assembly is connected to at least one of the opposite surface, the first side surface, and the second side surface.

The assembling portion 420 includes a first assembly 421, a second assembly 422, and a third assembly 423. The assembling portion 420 may have a step shape in cross-section when viewed in the first direction DR1.

In detail, the first assembly 421 is connected to the one side surface of the light guide portion 410 and extends along the one side surface. An upper surface of the first assembly 421 is disposed on the same surface as that of the light guide portion 410. The first assembly 421 is connected to at least one of the opposite surface, the first side surface, and the second side surface. A length in the second direction DR2 may be equal to a length of the light guide portion 410 in the second direction DR2.

The second assembly 422 is disposed on the first assembly 421. A length of the second assembly 422 in the second direction DR2 may be shorter than a length of the first assembly 421 in the second direction DR2. For instance, the length of the second assembly 422 in the second direction DR2 may correspond to two-thirds of the length of the first assembly 421 in the second direction.

When viewed in a plan view, the second assembly 422 is entirely overlapped with the first assembly 421. The overlapped area is referred to as a "first overlap area". The first overlap area is formed on one end portion of the first assembly 421 in the second direction DR2.

In detail, the second assembly 422 is disposed at one side of the upper surface of the first assembly 421 in the second direction DR2. Accordingly, at least a portion of the upper surface of the first assembly 421 is exposed by the second assembly 422. The exposed portion of the upper surface of the first assembly 421 is referred to as a first support surface S1. The first support surface S1 is disposed at the other side of the upper surface of the first assembly 421 in the second direction DR2.

The third assembly 423 is disposed on the second assembly 422. A length of the third assembly 423 in the second direction DR2 may be shorter than the length of the second assembly 422 in the second direction DR2. For instance, the length of the third assembly 423 in the second direction DR2 may correspond to one-third of the length of the first assembly 421 in the second direction.

When viewed in a plan view, the third assembly 423 is entirely overlapped with the second assembly 422. The overlapped area is referred to as a "second overlap area". The second overlap area is entirely overlapped with the first overlap area and is formed on the one end portion of the first assembly portion 421 in the second direction DR2.

In detail, the third assembly 423 is disposed at one side of the upper surface of the second assembly 422 in the second direction DR2. Accordingly, at least a portion of the upper surface of the second assembly 422 is exposed by the third assembly 423. The exposed portion of the upper surface of the second assembly 422 is referred to as a second support surface S2. The second support surface S2 is disposed at the other side of the upper surface of the second assembly 422 in the second direction DR3. An upper surface of the third assembly 423 is referred to as a third support surface S3.

In the present exemplary embodiment, the first and second overlap areas are defined to be placed at the one side portion of the assembling portion 420 in the second direction DR2, but they should not be limited thereto or thereby. For instance, according to another embodiment, the first and second overlap areas may be defined in a center of the assembling portion 420. That is, the second and third assemblies 422 and 423 may be disposed at the center of the upper surface of the first assembly 421 in the second direction DR2.

The optical sheets 500 are disposed above the light guide plate 400 to cover the upper surface of the light guide plate 400. The first, second, and third optical sheets 510, 520, and 530 include body portions 511, 521, and 531, respectively, and wing portions 512, 522, 532, respectively. When viewed in a plan view, the body portions 511, 521, and 531 are overlapped with the light guide portion 410 of the light guide plate 400, and the wing portions 512, 522, and 532 are overlapped with the assembling portion 420 of the light guide plate 400. The body portions 511, 521, and 531 diffuse and condense the light provided from the light guide portion 410 and provide the light to the display panel 300. When viewed in a plan view, the wing portions 512, 522, and 532 are overlapped with a portion of the non-display area NDA. The wing portions 512, 522, and 532 may have a step shape in cross-section to be engaged with the assembling portion 420 when assembled.

The first optical sheet 510 includes a first body portion 511 and a first wing portion 512. The first body portion 511 is placed on the upper surface of the light guide portion 410 to cover the upper surface of the light guide portion 410. The first wing portion 512 is connected to one side portion of the first body portion 511 in the first direction DR1 and extends in the second direction DR2 along the one side portion of the first body portion 511. The first wing portion 512 is connected to the first body portion 511 at a corner of the first body portion 511. The first wiring portion 512 is formed to overlap the first support surface S1 and not to overlap the second supporting surface S2 and the third supporting surface S3 in a plan view.

The second optical sheet 510 includes a second body portion 521 and a second wing portion 522. The second body portion 521 is placed on the upper surface of the first body portion 511 to cover the upper surface of the first body portion 511. In the present exemplary embodiment, the second body portion 521 may have the same shape and size as those of the first body portion 511. That is, the second body portion 521 may be overlapped with the first body portion 511. The second wing portion 522 is connected to one side portion of the second body portion 521 in the first direction DR1 and extends in the second direction DR2 along the one side portion of the second body portion 521. The second wing portion 522 is connected to the second body portion 521 at the corner of the second body portion 521. The second wiring portion 522 is formed to overlap the first support surface S1 and the second support surface S2 and not to overlap the third supporting surface S3 in a plan view. A length of the first wing portion 512 in the second direction DR2 may be shorter than a length of the second wing portion 522 in the second direction DR2. When viewed in a plan view, the first wing portion 512 is entirely overlapped with the second wing portion 522.

The third optical sheet 530 includes a third body portion 531 and a third wing portion 532. The third body portion 531 is placed on the upper surface of the second body portion 521 to cover the upper surface of the second body portion 521. In the present exemplary embodiment, the third body portion 531 may have the same shape and size as those of the second body portion 521. The third wing portion 532 is connected to one side portion of the third body portion 531 in the first direction DR1 and extends in the second direction DR2 along the one side portion of the third body portion 531.

A length of the second wing portion 522 in the second direction DR2 may be shorter than a length of the third wing portion 532 in the second direction DR2. When viewed in a plan view, the second wing portion 522 is entirely overlapped with the third wing portion 532. The third wiring portion 532 is formed to overlap the first support surface S1, the second support surface S2 and the third supporting surface S3 in a plan view.

The length of the third wing portion 532 in the second direction DR2 may be equal to a length of the third body portion 531 in the second direction DR2. That is, a shape of the third body portion 531 and the third wing portion 532 connected to each other correspond to a shape of one sheet.

In the present exemplary embodiment, the first wing portion 512 and the second wing portion 522 are respectively connected to the first body portion 511 and the second body portion 521 at the corner of the first and second body portions 511 and 521, but they should not be limited thereto or thereby. According to another embodiment, the first and second wing portions 512 and 522 may be respectively connected to the first and second body portions 511 and 521 at a center of the first and second body portions 511 and 521.

Figure 5:
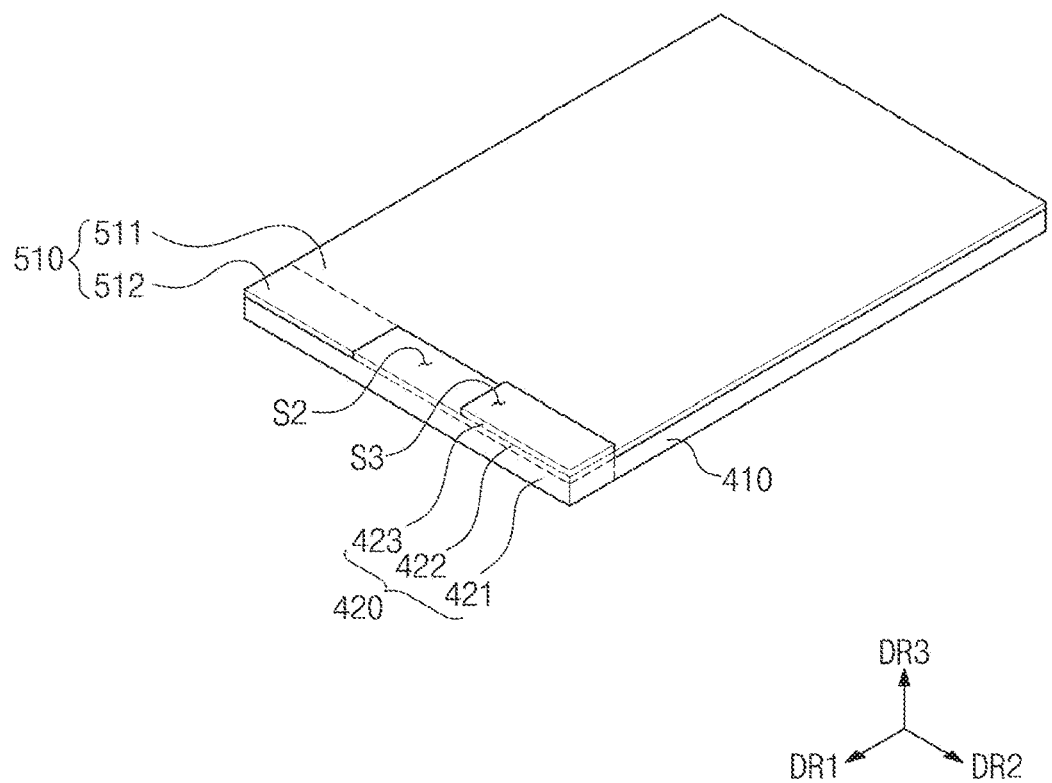
FIG. 5 is a perspective view showing a first optical sheet placed on the light guide plate.
Figure 6:
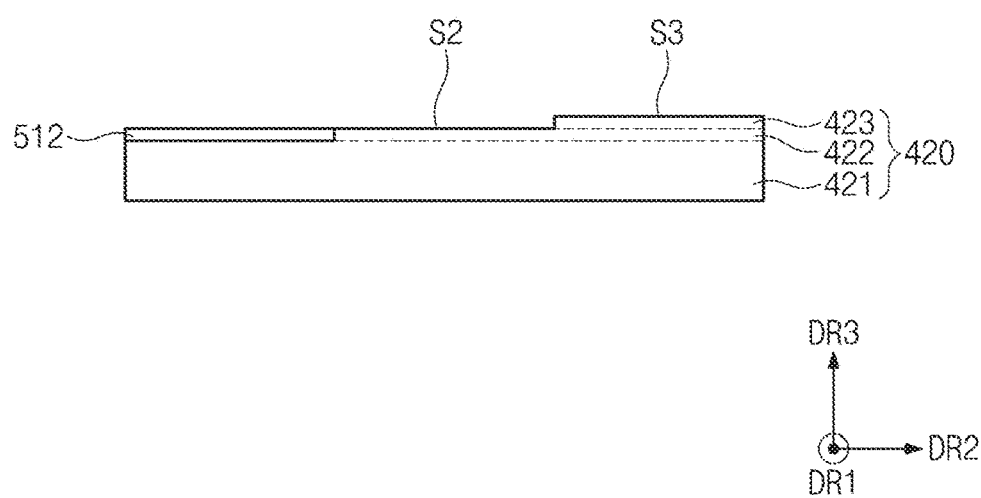
FIG. 6 is a cross-sectional view showing the first optical sheet placed on the light guide plate.

FIG. 5 is a perspective view showing the first optical sheet 510 placed on the light guide plate 400, and FIG. 6 is a cross-sectional view showing the first optical sheet 510 placed on the light guide plate 400.

Referring to FIGS. 5 and 6, the first optical sheet 510 is placed on the upper surface of the light guide plate 400 to cover the upper surface of the light guide plate 400. A lower surface of the first body portion 511 makes contact with the upper surface of the light guide portion 410 to cover the upper surface of the light guide portion 410, and a lower surface of the first wing portion 511 makes contact with the first support surface S1 of the first assembly 421 to cover the first support surface S1. In this case, the first optical sheet 510 has the same thickness as that of the second assembly 422. Accordingly, the upper surface of the first optical sheet 510 may be disposed on the same plane surface as the second support surface S2.

Figure 7:
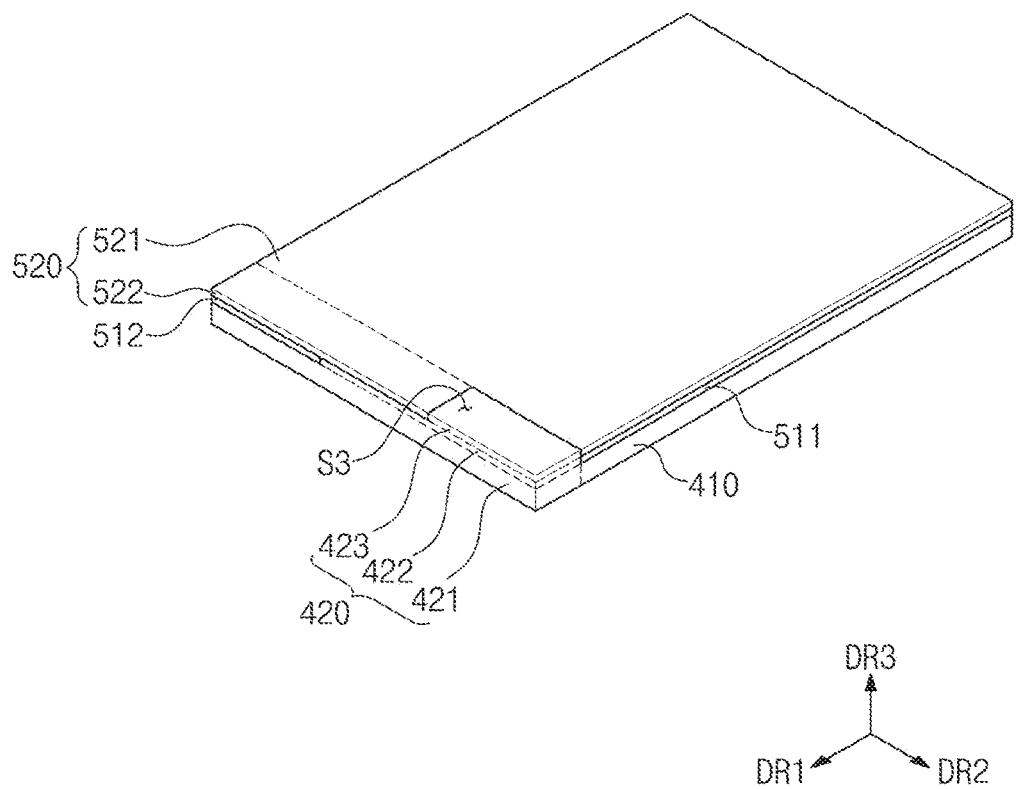
FIG. 7 is a perspective view showing a second optical sheet placed on the light guide plate.
Figure 8:
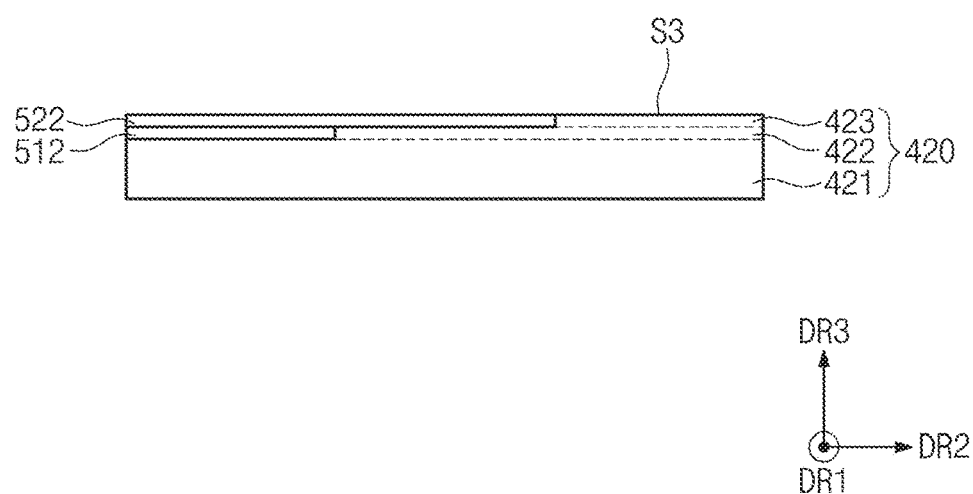
FIG. 8 is a cross-sectional view showing the second optical sheet placed on the light guide plate.

FIG. 7 is a perspective view showing the second optical sheet 520 placed on the light guide plate 400, and FIG. 8 is a cross-sectional view showing the second optical sheet 520 placed on the light guide plate 400.

Referring to FIGS. 7 and 8, the second optical sheet 520 is placed on the upper surface of the first optical sheet 510 to cover the first optical sheet 510 and the second support surface S2. A lower surface of the second body portion 521 makes contact with the upper surface of the first body portion 511 to cover the upper surface of the first body portion 511, and a lower surface of the second wing portion 522 makes contact with the second support surface S2 of the second assembly 422 and the upper surface of the first wing portion 512 to cover the second support surface S2 and the upper surface of the first wing portion 512. In this case, the second optical sheet 520 has the same thickness as that of the third assembly 423. Accordingly, the upper surface of the second optical sheet 520 may be disposed on the same plane surface as the third support surface S3.

Figure 9:
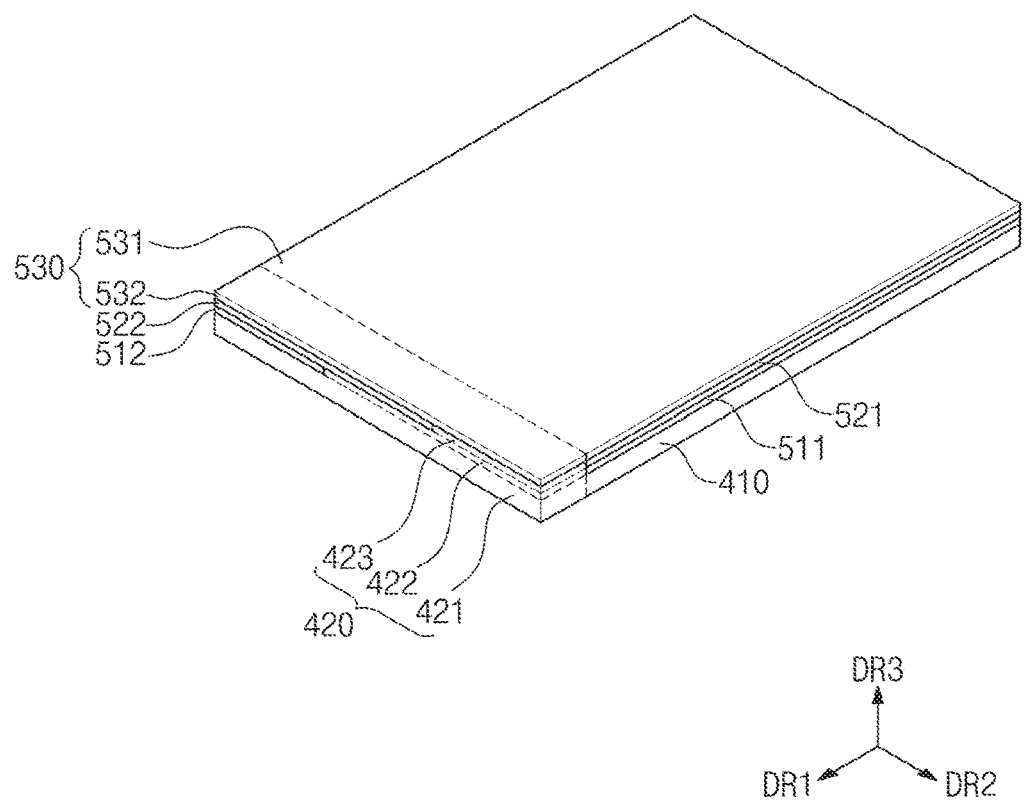
FIG. 9 is a perspective view showing a third optical sheet placed on the light guide plate.
Figure 10:
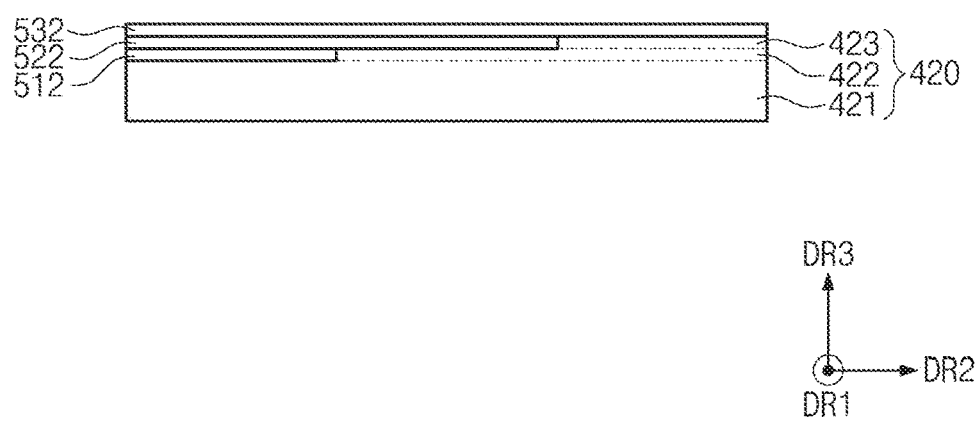
FIG. 10 is a cross-sectional view showing the third optical sheet placed on the light guide plate.

FIG. 9 is a perspective view showing the third optical sheet 530 placed on the light guide plate 400, and FIG. 10 is a cross-sectional view showing the third optical sheet 530 placed on the light guide plate 400.

Referring to FIGS. 9 and 10, the third optical sheet 530 is placed on the upper surface of the second optical sheet 520 to cover the second optical sheet 520 and the third support surface S3. A lower surface of the third body portion 531 makes contact with the upper surface of the second body portion 521 to cover the upper surface of the second body portion 521, and a lower surface of the third wing portion 532 makes contact with the third support surface S3 of the third assembly 423 and the upper surface of the second wing portion 522 to cover the third support surface S3 and the upper surface of the second wing portion 522.

According to the present exemplary embodiment, the wing portions 512, 522, and 532 of the optical sheets 500 respectively cover the first, second, and third support surfaces S1, S2, and S3 with step differences from each other and are coupled with the assembling portion 420 of the light guide plate 400. Accordingly, the optical sheets 500 may be prevented from moving. Thus, the display apparatus 1000 may have improved display quality. In addition, an assemblability of the optical sheets 500 may be improved.

According to the present exemplary embodiment, the first, second, and third optical sheets 510, 520, and 530 have the same thickness as each other. However, the first, second, and third optical sheets 510, 520, and 530 may have different thicknesses from each other in accordance with their functions. For instance, the first optical sheet 510 has the thickness of about 0.12 mm, the second optical sheet 520 has the thickness of about 0.155 mm, and the third optical sheet 530 has the thickness of about 0.39 mm.

In addition, according to the present exemplary embodiment, the length in the first direction DR1 of each of the first, second, and third wing portions 512, 522, and 532 of the first, second, and third optical sheets 510, 520, and 530 may have a minimum value as long as the first, second, and third optical sheets 510, 520, and 530 are coupled to the assembling portion 420. For instance, the length in the first direction DR1 of each of the first, second, and third wing portions 512, 522, and 532 of the first, second, and third optical sheets 510, 520, and 530 may be equal to or greater than about 2 mm.

Figure 11:
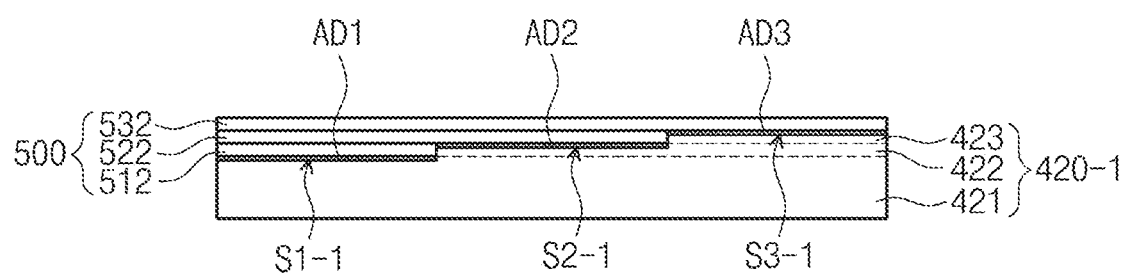
FIG. 11 is a cross-sectional view showing optical sheets and a light guide plate according to another exemplary embodiment of the present disclosure.
Figure 11:
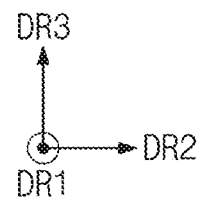

FIG. 11 is a cross-sectional view showing optical sheets and a light guide plate according to another exemplary embodiment of the present disclosure, and FIGS. 12A to 12G are perspective views showing processes of placing the optical sheets on the light guide plate.

In the present exemplary embodiment, for the convenience of explanation, different features from the above-described embodiment will be mainly described. In addition, the same reference numerals in the present exemplary embodiment denote the same elements in the above-described embodiment, and thus detailed descriptions of the same elements will be omitted.

Referring to FIG. 11, a backlight unit further includes a first adhesive member AD1, a second adhesive member AD2, and a third adhesive member AD3. The first, second, and third adhesive members AD1, AD2, and AD3 include an adhesive material. For instance, each of the first, second, and third adhesive members AD1, AD2, and AD3 may be, but not limited to, a double-sided tape.

Figure 12A:
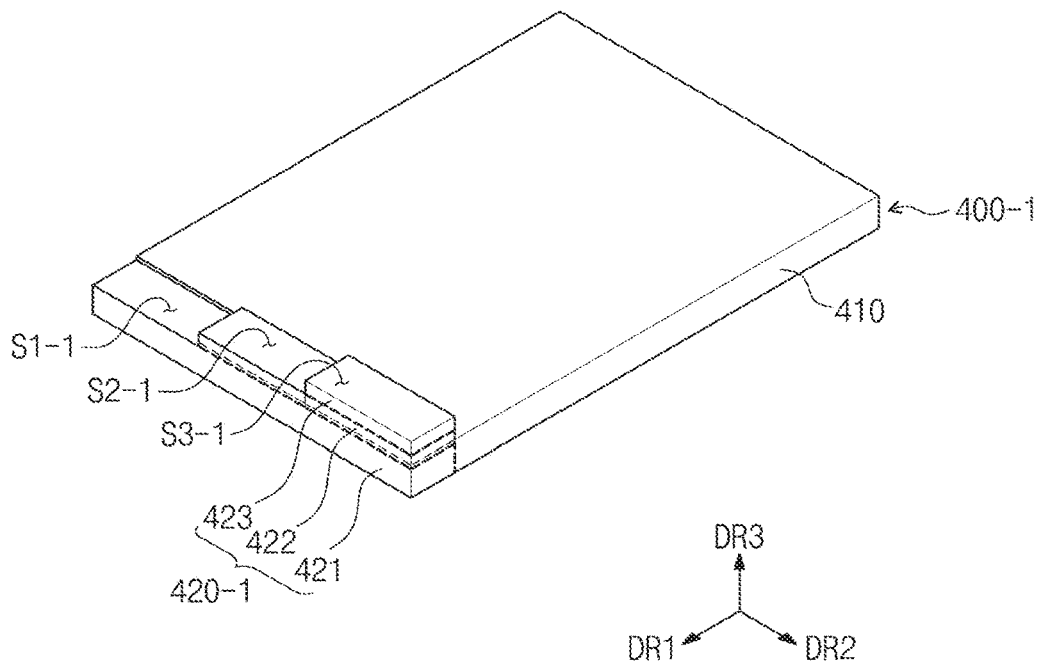
FIGS. 12A, 12B, 12C, 12D, 12E, 12F and 12G are perspective views showing processes of placing the optical sheets on the light guide plate.

Referring to FIGS. 11 and 12A, the upper surface of the first assembly 421 may be disposed at a position lower than that of the upper surface of the light guide portion 410. Accordingly, a plane surface defined by a first support surface S1-1 may form a step difference with a plane surface defined by the upper surface of the light guide portion 410.

Figure 12B:
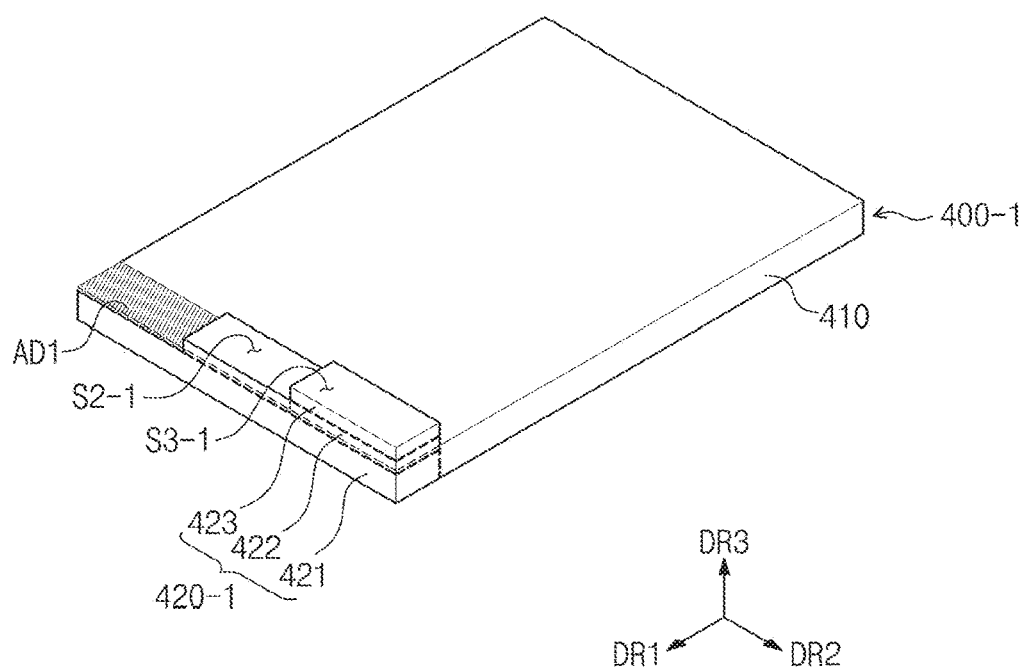

Referring to FIGS. 11 and 12B, the first adhesive member AD1 is placed on the first support surface S1-1. A height of the step difference between the first support surface S1-1 and the light guide portion 410 may be equal to a thickness of the first adhesive member AD1. Accordingly, the upper surface of the first adhesive member AD1 may be disposed on the same plane surface as the upper surface of the light guide portion 410.

Figure 12C:
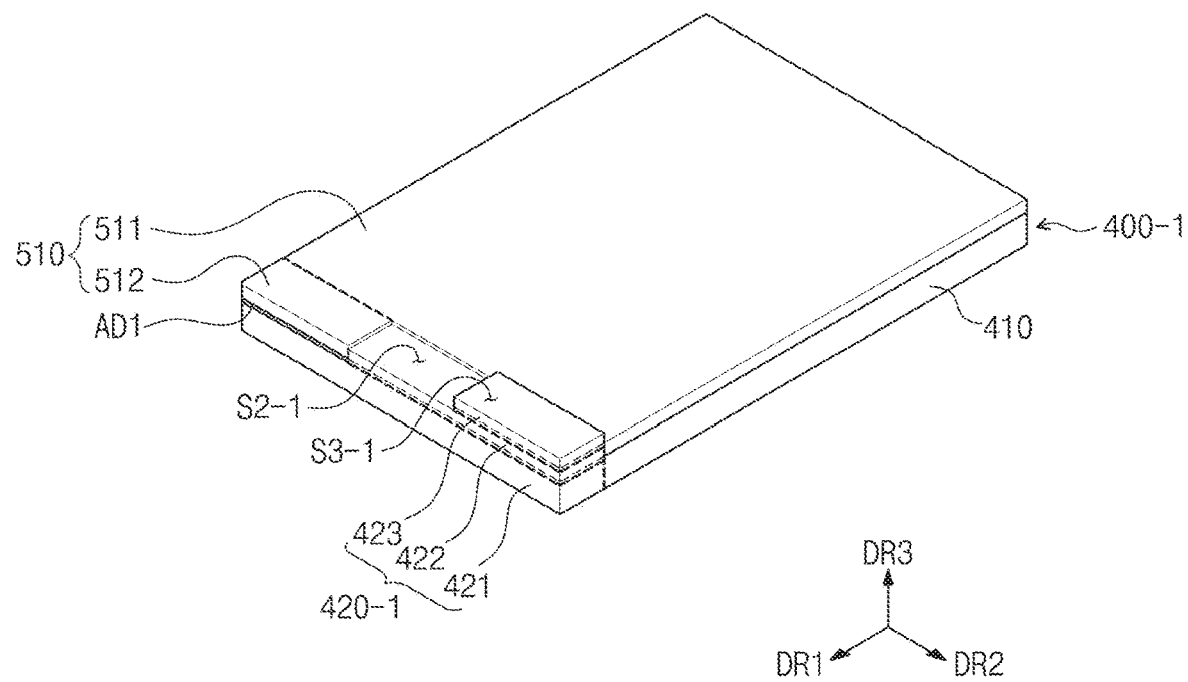

Referring to FIGS. 11 and 12C, the first optical sheet 510 is placed on the upper surface of the light guide plate 400 to cover the upper surface of the light guide portion 400 and the upper surface of the first adhesive member AD1. The lower surface of the first body portion 511 makes contact with the upper surface of the light guide portion 410, and the lower surface of the first wing portion 511 makes contact with the first adhesive member AD1. The first wing portion 512 may be fixed to the first assembly 421 by the first adhesive member AD1.

After the first optical sheet 510 is placed, the upper surface of the second assembly 422 may be disposed at a position lower than that of the upper surface of the first optical sheet 510. Therefore, a plane surface defined by a second support surface S2-1 may form a step difference with a plane surface defined by the upper surface of the first optical sheet 510.

Figure 12D:
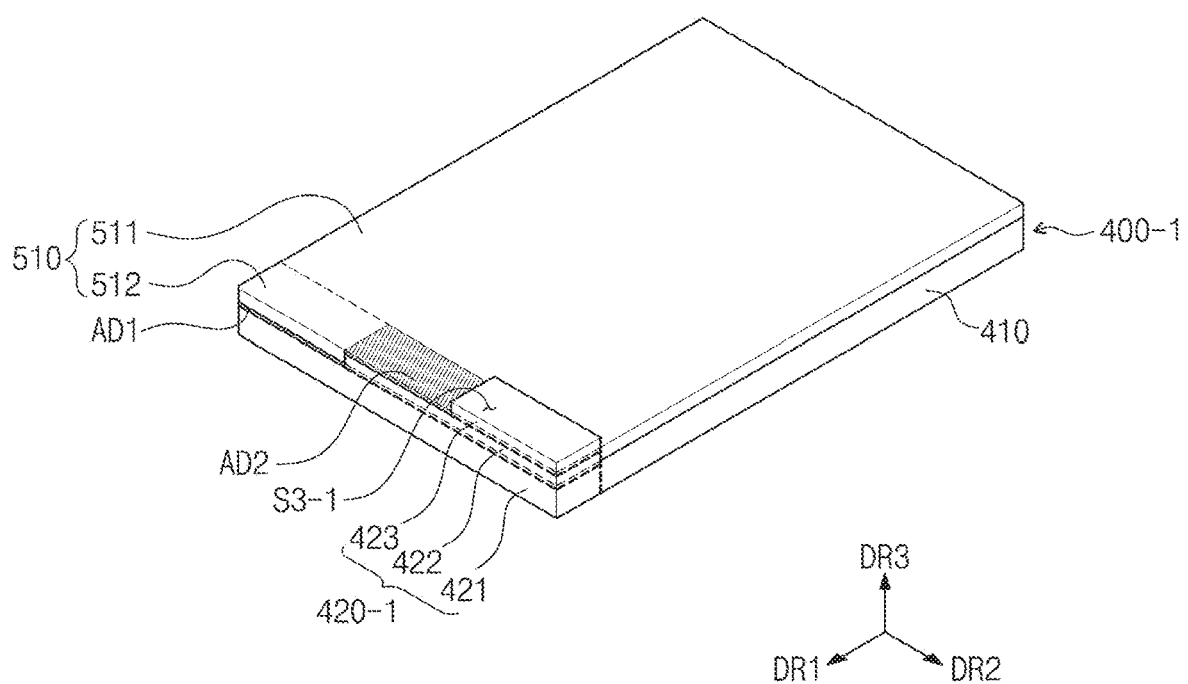

Referring to FIGS. 11 and 12D, the second adhesive member AD2 is placed on the second support surface S2-1. A height of the step difference between the second support surface S2-1 and the first optical sheet 510 may be equal to a thickness of the second adhesive member AD2. Accordingly, the upper surface of the second adhesive member AD2 may be disposed on the same plane surface as the upper surface of the first optical sheet 510.

Figure 12E:
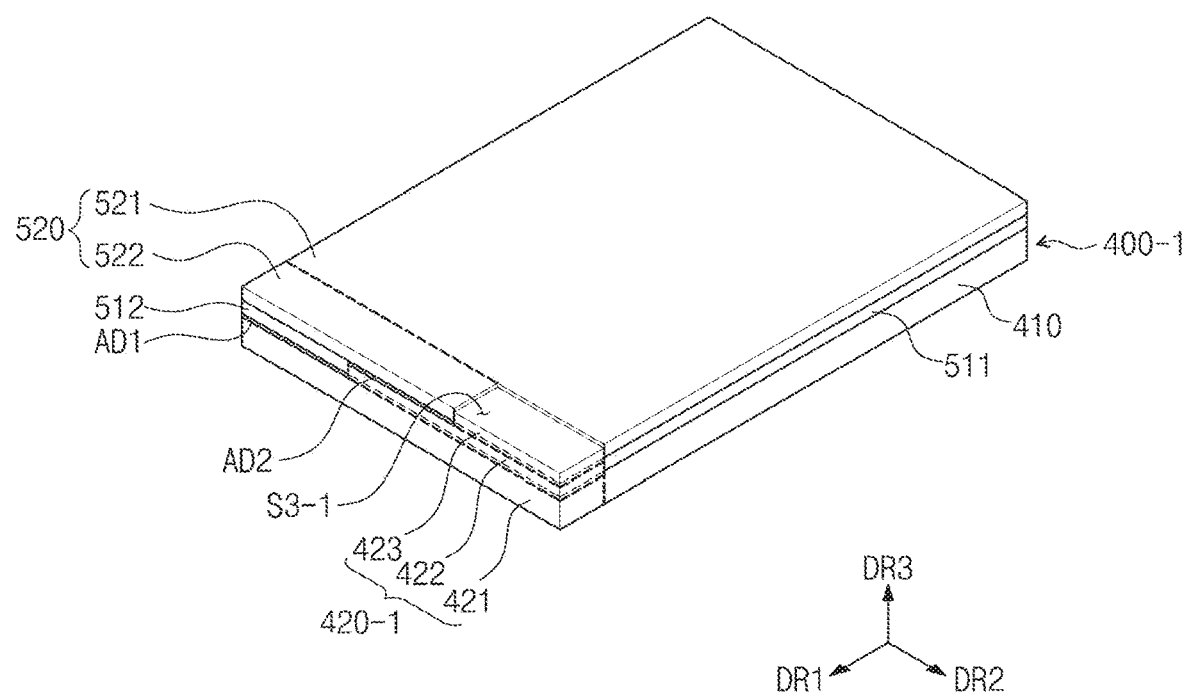

Referring to FIGS. 11 and 12E, the second optical sheet 520 is placed on the upper surface of the first optical sheet 510 to cover the upper surface of the first optical sheet 510 and the upper surface of the second adhesive member AD2. The lower surface of the second body portion 521 makes contact with the upper surface of the first body portion 511, and the lower surface of the second wing portion 522 makes contact with the second adhesive member AD2 and the upper surface of the first wing portion 512. The second wing portion 522 may be fixed to the second assembly 422 by the second adhesive member AD2.

After the second optical sheet 520 is placed, the upper surface of the third assembly 423 may be disposed at a position lower than that of the upper surface of the second optical sheet 520. Therefore, a plane surface defined by a third support surface S3-1 may form a step difference with a plane surface defined by the upper surface of the second optical sheet 520.

Figure 12F:
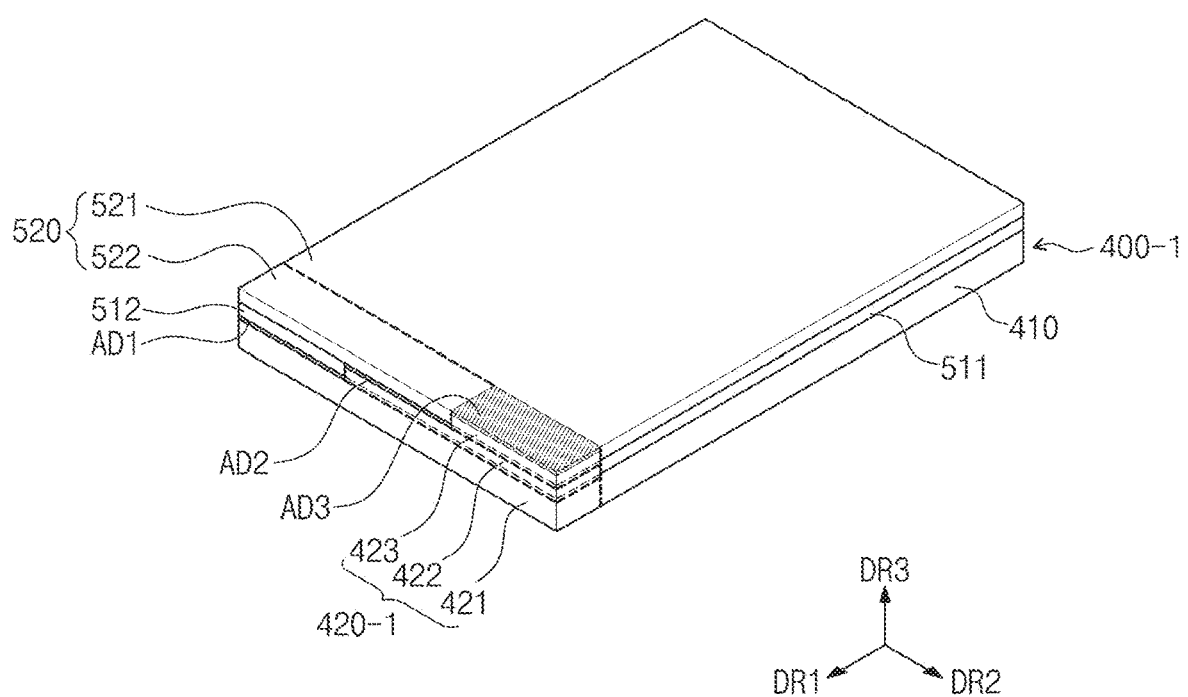
Figure 12G:
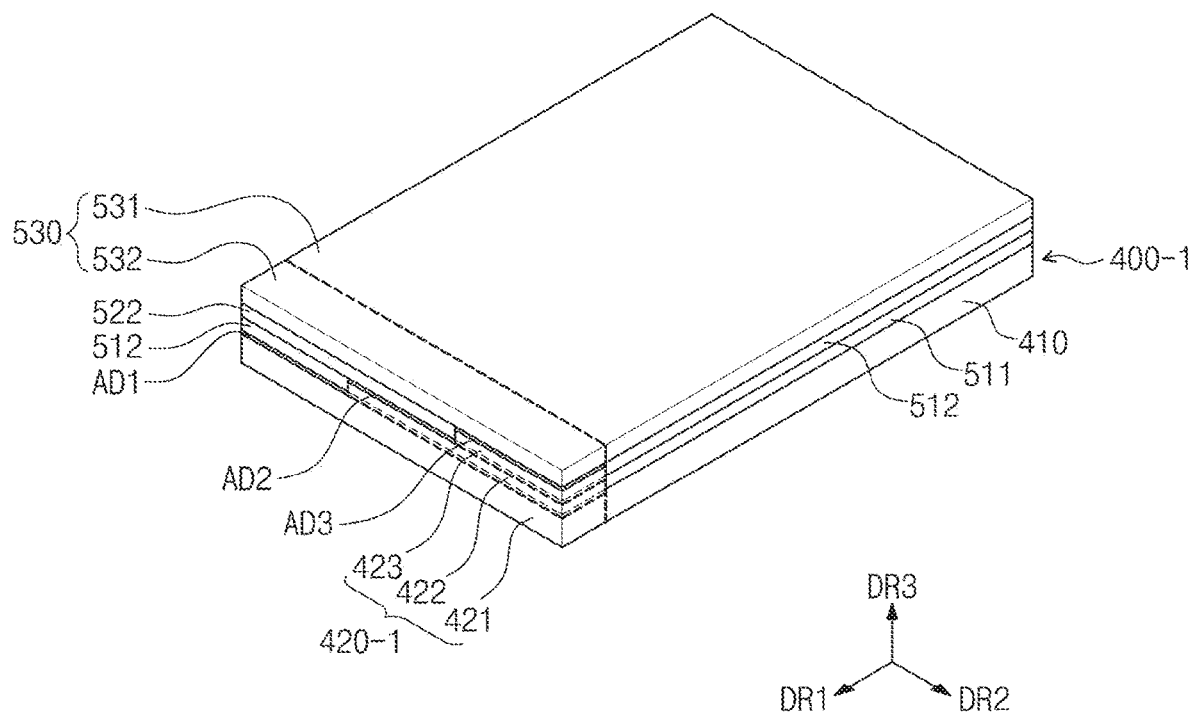

Referring to FIGS. 11 and 12F, the third adhesive member AD3 is placed on the third support surface S3-1. A height of the step difference between the third support surface S3-1 and the second optical sheet 520 may be equal to a thickness of the third adhesive member AD3. Accordingly, the upper surface of the third adhesive member AD3 may be disposed on the same plane surface as the upper surface of the second optical sheet 520.

Referring to FIGS. 11 and 12C the third optical sheet 530 is placed on the upper surface of the second optical sheet 520 to cover the upper surface of the second optical sheet 520 and the upper surface of the third adhesive member AD3. The lower surface of the third body portion 531 makes contact with the upper surface of the second body portion 521, and the lower surface of the third wing portion 532 makes contact with the third adhesive member AD3 and the upper surface of the second wing portion 522. The third wing portion 532 may be fixed to the third assembly 423 by the third adhesive member AD3.

According to the present exemplary embodiment, the first, second, and third adhesive members AD1, AD2, and AD3 are disposed on the assembling portion 420, but they should not be limited thereto or thereby. For instance, the first, second, and third adhesive members AD1, AD2, and AD3 may be connected to each other, and the first, second, and third adhesive members AD1, AD2, and AD3 may be simultaneously placed on the assembling portion 420 through one adhering process. In this case, the manufacturing process for the backlight unit may be simplified.

In addition, according to the present exemplary embodiment, the upper surface of each of the first, second, and third adhesive members AD1, AD2, and AD3 forms the step difference with the upper surface of the light guide portion 410 and the upper surface of the first and second optical sheets 510 and 520, the step difference, which is caused by the thickness of the first, second, and third adhesive members AD1, AD2, and AD3, may be compensated.

Consequently, the optical sheets 500 may be effectively prevented from moving. In addition, the assemblability of the optical sheets 500 may be improved.

Figure 13A:
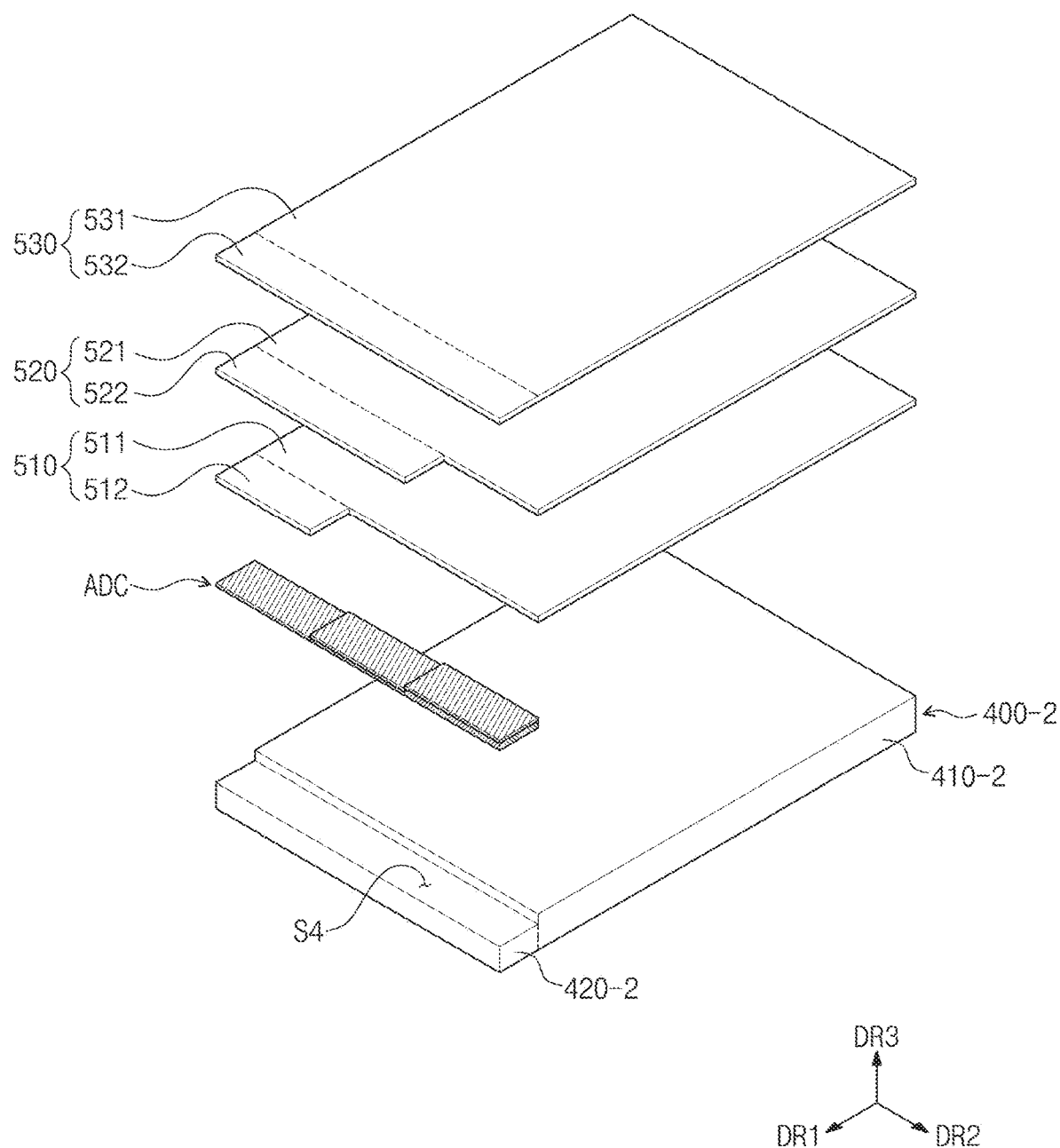
FIG. 13A is an enlarged perspective view showing optical sheets and a light guide plate according to another exemplary embodiment of the present disclosure.
Figure 13B:
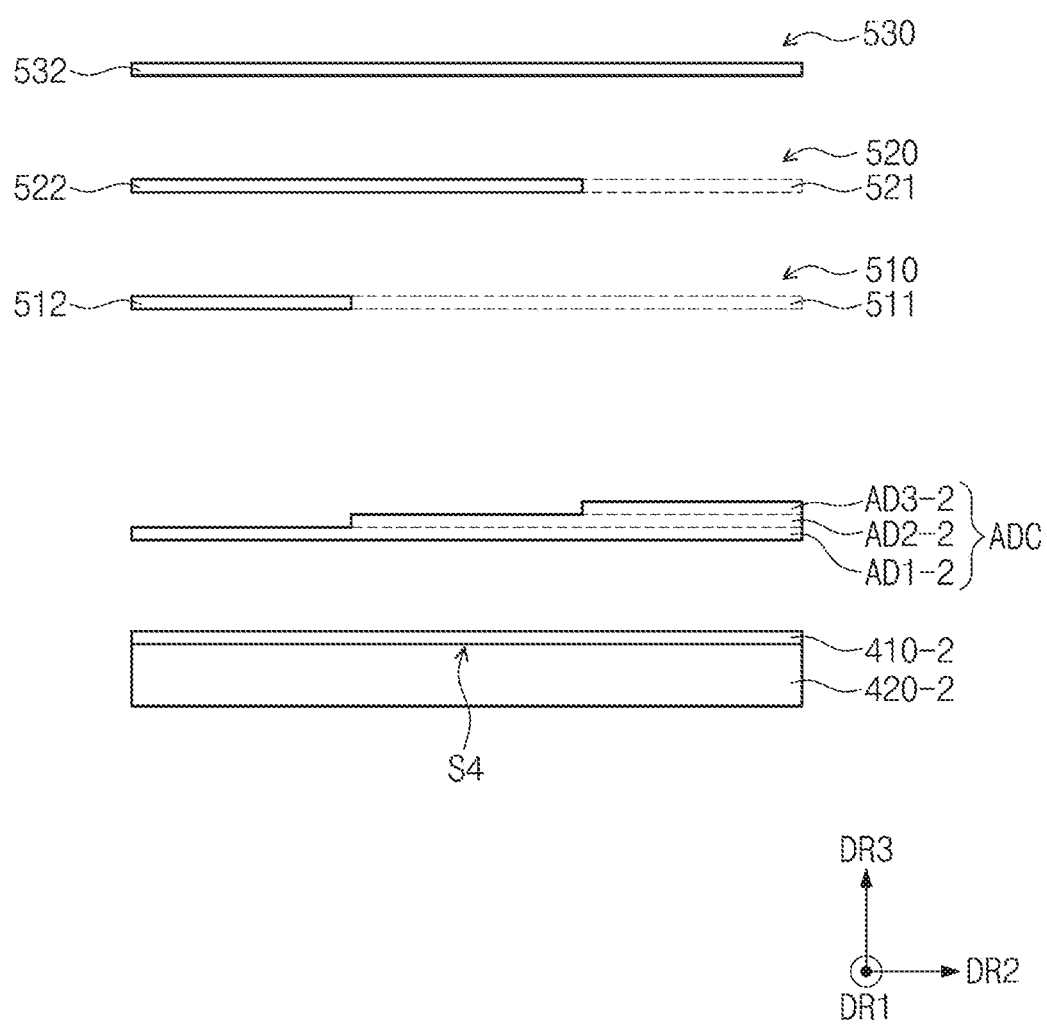
FIG. 13B is a cross-sectional view showing the optical sheets and the light guide plate shown in FIG. 13A.

FIG. 13A is an enlarged perspective view showing optical sheets and a light guide plate according to another exemplary embodiment of the present disclosure, and FIG. 13B is a cross-sectional view showing the optical sheets and the light guide plate shown in FIG. 13A. In FIGS. 13A and 13B, the same reference numerals denote the same elements in the above-described embodiments, and thus detailed descriptions of the same elements will be omitted.

Referring to FIGS. 13A and 13B, an assembling portion 420-2 has a bar shape extending in the second direction DR2. The assembling portion 420-2 is connected to one side portion of a light guide portion 410-2 in the first direction DR1.

An upper surface S4 of the assembling portion 420-2, which is referred to as a fourth support surface S4, may be disposed at a plane lower than an upper surface of the light guide portion 410-2. Accordingly, a plane surface defined by the fourth support surface S4 may form a step difference with a plane surface defined by the upper surface of the light guide portion 410-2.

The backlight unit according to the present exemplary embodiment further includes an adhesive structure ADC. The adhesive structure ADC may have a step shape in cross-section.

In detail, the adhesive structure ADC includes a first adhesive member AD1-2, a second adhesive member AD2-2, and a third adhesive member AD3-2. The first adhesive member AD1-2 may be placed on the fourth support surface S4 of the assembling portion 420-2. The first adhesive member AD1-2 is entirely overlapped with the fourth support surface S4.

The second adhesive member AD2-2 is disposed on the first adhesive member AD1-2 to cover one end portion of the first adhesive member AD1-2 in the second direction DR2. A length of the second adhesive member AD2-2 in the second direction DR2 is shorter than a length of the first adhesive member AD1-2 in the second direction DR2. A step difference between the first adhesive member AD1-2 and the second adhesive member AD2-2 may be the same as a thickness of the first optical sheet 510.

The third adhesive member AD3-2 is disposed on the second adhesive member AD2-2 to cover one side portion of the second adhesive member AD2-2 in the second direction DR2. A length of the third adhesive member AD3-2 in the second direction DR2 is shorter than a length of the second adhesive member AD2-2 in the second direction DR2. A step difference between the second adhesive member AD2-2 and the third adhesive member AD3-2 may be the same as a thickness of the second optical sheet 520.

The step difference between the fourth support surface S4 and the upper surface of the light guide portion 410-2 may be equal to a thickness of the first adhesive member AD1-2. Accordingly, in a case that the adhesive structure ADC is placed on the fourth support surface S4, the upper surface of the first adhesive member AD1-2 may be disposed on the same plane surface as the upper surface of the light guide portion 410-2.

The optical sheets 500 may be disposed on the upper surface of the adhesive structure ADC and the upper surface of the light guide portion 410-2. Due to the adhesive structure ADC, the wing portions 512, 522, and 523 of the optical sheets 500 may be fixed to the assembling portion 420-2.

According to the present exemplary embodiment, the assemblability of the display apparatus may be effectively improved.

Figure 14:
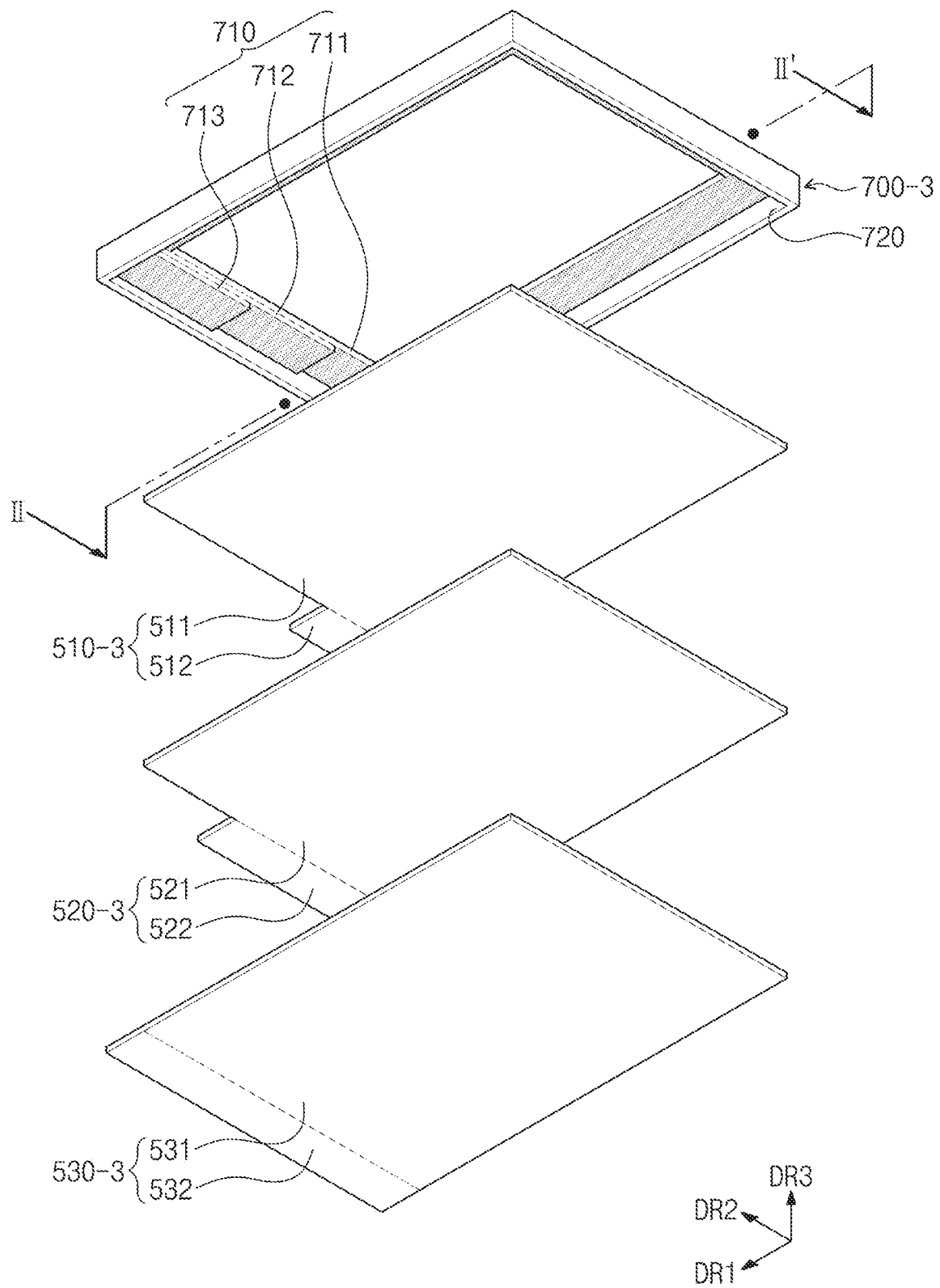
FIG. 14 is an exploded perspective view showing optical sheets and a mold frame according to another exemplary embodiment of the present disclosure.
Figure 15:
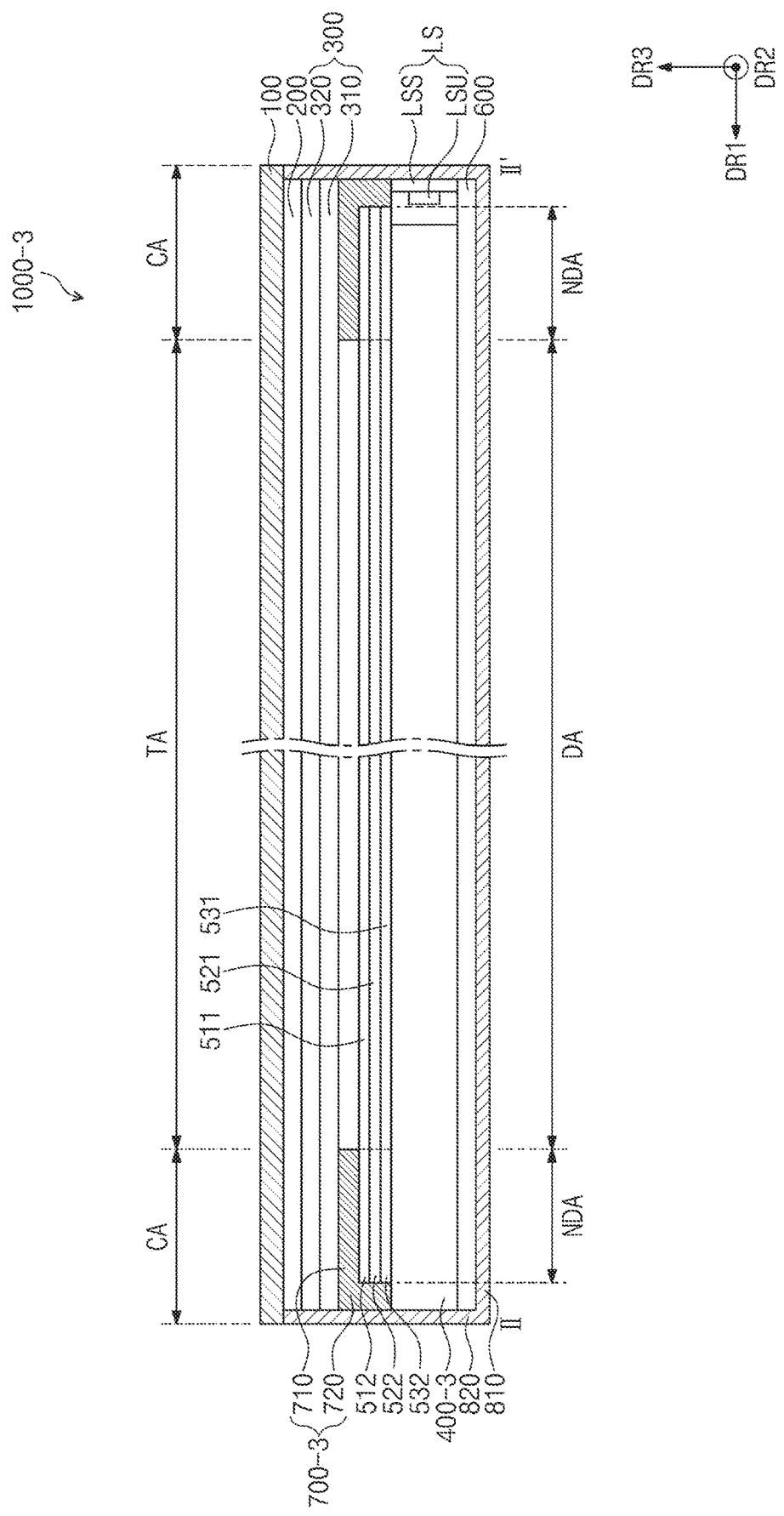
FIG. 15 is a cross-sectional view showing a display apparatus including the optical sheets and the mold frame shown in FIG. 14.
Figure 16:
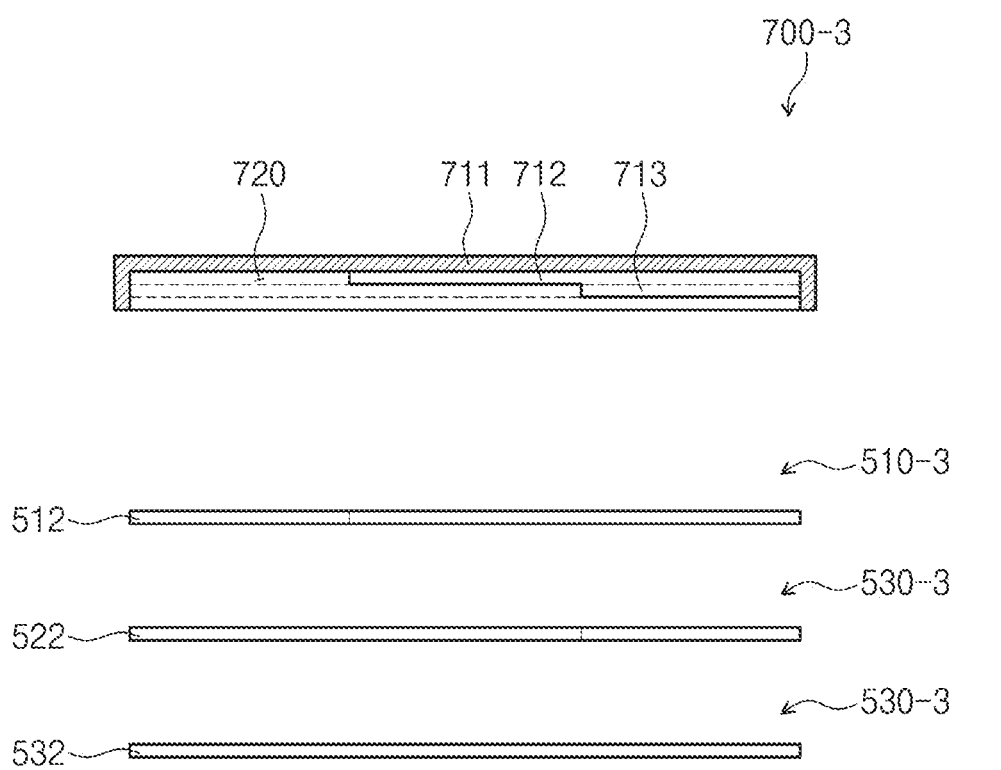
FIG. 16 is a cross-sectional view showing the optical sheets and the mold frame shown in FIG. 14.
Figure 16:
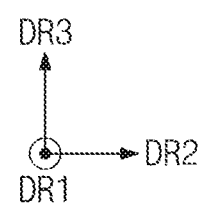

FIG. 14 is an exploded perspective view showing optical sheets and a mold frame according to another exemplary embodiment of the present disclosure, FIG. 15 is a cross-sectional view showing a display apparatus including the optical sheets and the mold frame shown in FIG. 14, and FIG. 16 is a cross-sectional view showing the optical sheets and the mold frame shown in FIG. 14.

In FIGS. 14 to 16, the same reference numerals denote the same elements in the above-described embodiments, and thus detailed descriptions of the same elements will be omitted.

Referring to FIGS. 14 to 16, a mold frame 700-3 includes a bottom mold 710 and a sidewall mold 720.

The bottom mold 710 is entirely overlapped with the non-display area NDA of the display panel 300. The bottom mold 710 includes a first bottom mold 711, a second bottom mold 712, and a third bottom mold 713. The first bottom mold 711 has a frame shape substantially parallel to a plane surface defined by the first direction DR1 and the second direction DR2. The display panel 300 may be placed on an upper surface of the first bottom mold 711.

The second bottom mold 712 is disposed under one end portion of the first bottom mold 711 in the first direction DR1. That is, an upper surface of the second bottom mold 712 is overlapped with a portion of the one end portion of the lower surface of the first bottom mold 711. A length of the second bottom mold 712 in the second direction DR2 may be shorter than a length of the first bottom mold 711 in the second direction DR2. For instance, the length of the second bottom mold 712 in the second direction DR2 may correspond to two-thirds of the length of the first bottom mold 711 in the second direction DR2. When viewed in a plan view, the bottom mold 712 is entirely overlapped with the first bottom mold 711.

The overlap area is defined to be placed at the one end portion of the first bottom mold 711 in the second direction DR2. That is, the second bottom mold 712 is disposed at the one end portion of the lower surface of the first bottom mold 711. Accordingly, at least a portion of the lower surface of the first bottom mold 711 may be exposed by the second bottom mold 712. The exposed portion of the lower surface is disposed at the other end portion of the first bottom mold 711 in the second direction DR2.

The third bottom mold 713 is disposed under one end portion of the second bottom mold 712 in the second direction DR2. A length of the third bottom mold 713 in the second direction DR2 may be shorter than the length of the second bottom mold 712 in the second direction DR2. For instance, the length of the third bottom mold 713 in the second direction DR2 may correspond to one-third of the length of the first bottom mold 711 in the second direction DR2. When viewed in a plan view, the third bottom mold 713 is entirely overlapped with the second bottom mold 712.

The overlap area is defined to be placed at the one end portion of the second bottom mold 712 in the second direction DR2. That is, the third bottom mold 713 is disposed at the one end portion of the lower surface of the second bottom mold 712. Accordingly, at least a portion of the lower surface of the second bottom mold 712 may be exposed by the third bottom mold 713. The exposed portion of the lower surface of the second bottom mold 712 is disposed at the other end portion of the second bottom mold 712 in the second direction DR2.

According to the present exemplary embodiment, the area in which the first, second, and third bottom molds 711, 712, and 713 are overlapped with each other are placed at the one end portion of the first bottom mold 711 in the second direction DR2. However, according to another embodiment, the area in which the first, second, and third bottom molds 711, 712, and 713 are overlapped with each other may be defined at a center of the first bottom mold 711 in the second direction DR2. That is, the second bottom mold 712 and the third bottom mold 713 may be disposed at the one side portion of the first bottom mold 711 in the first direction DR1 and disposed at the center of the first bottom mold 711 in the second direction DR2. The sidewall mold 720, the first bottom mold 711, the second bottom mold 712, and the third bottom 713 mold may be formed of the same material and be formed in one piece.

Optical sheets 500 include a first optical sheet 510-3, a second optical sheet 520-3, and a third optical sheet 530-3. The first optical sheet 510-3 is disposed between the first bottom mold 711 and the second optical sheet 520-3. The second optical sheet 520-3 is disposed between the first optical sheet 510-3 and the third optical sheet 530-3.

The first optical sheet 510-3 covers the lower surface of the first bottom mold 711, which is exposed by the second bottom mold 712 but does not cover the lower surface of the second bottom mold 712 and the lower surface of the third bottom mold 713.

The second optical sheet 520-3 covers the portion of the lower surface of the second bottom mold 712 and the lower surface of the first optical sheet 510-3, which are exposed by the third bottom mold 713. The second optical sheet 520-3 does not cover the portion of the lower surface of the third bottom mold 713.

The third optical sheet 530-3 covers the lower surface of the third bottom mold 713 and the lower surface of the second optical sheet 520-3.

The sidewall mold 720 has a shape bent outwardly from the bottom mold 710 and extending downwardly. A lower surface of the sidewall mold 720 may be disposed on the same plane surface as the lower surface of the third optical sheet 530-3. Accordingly, the sidewall mold 720 may cover the side surfaces of the first, second, and third optical sheets 510-3, 520-3, and 530-3.

Figure 17:
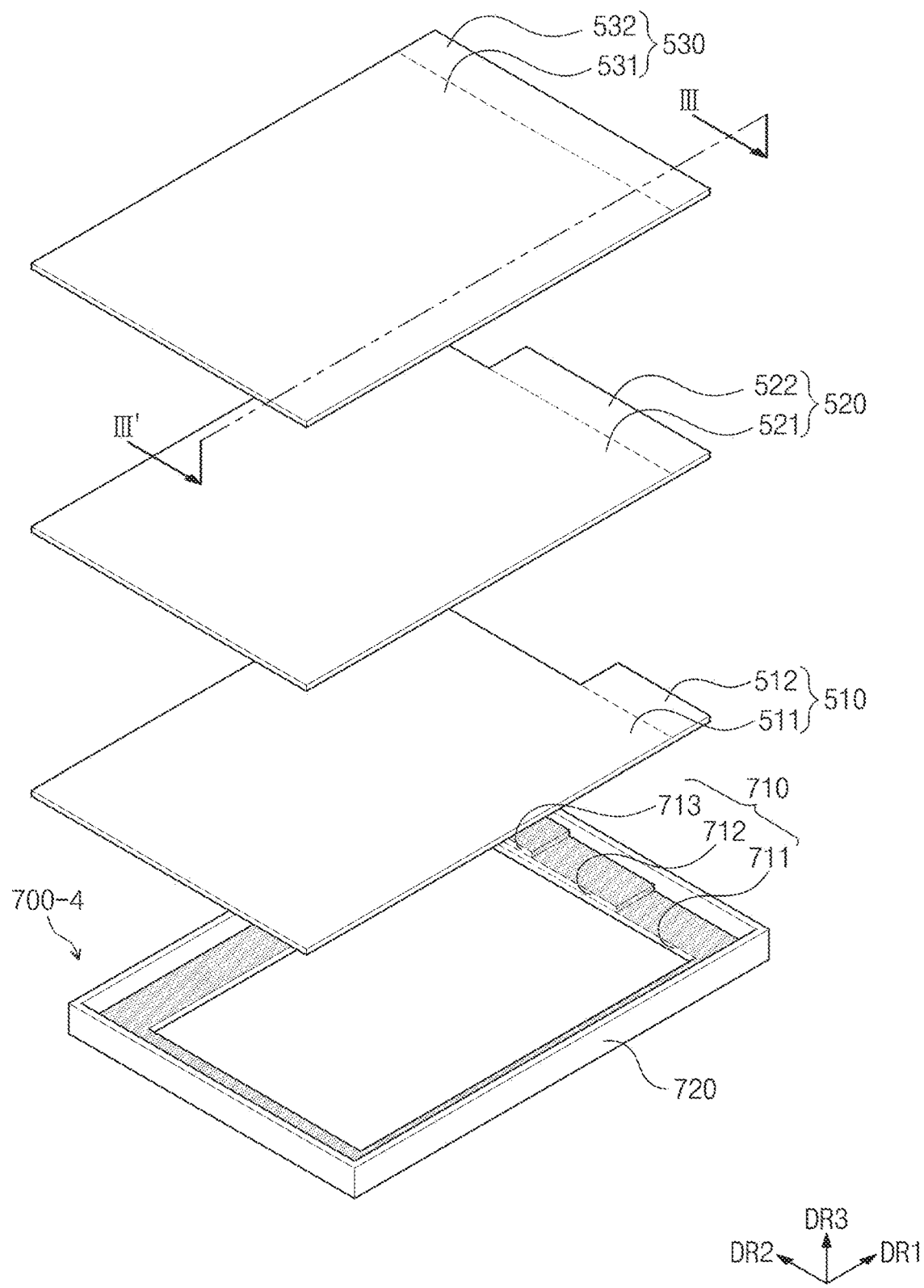
FIG. 17 is an exploded perspective view showing optical sheets and a mold frame according to another exemplary embodiment of the present disclosure.
Figure 18:
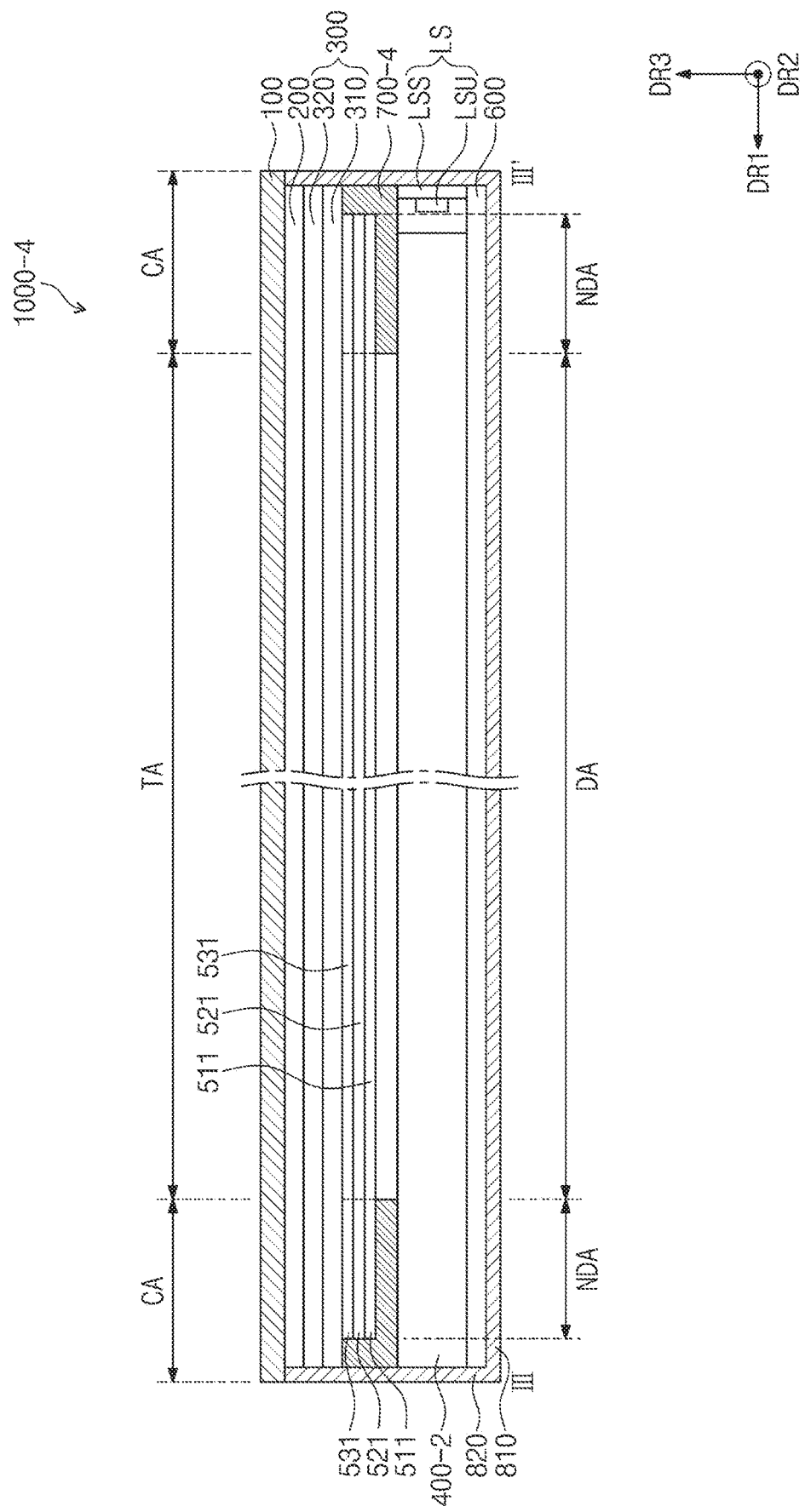
FIG. 18 is a cross-sectional view showing a display apparatus including the optical sheets and the mold frame shown in FIG. 17.

FIG. 17 is an exploded perspective view showing optical sheets and a mold frame according to another exemplary embodiment of the present disclosure, and FIG. 18 is a cross-sectional view showing a display apparatus including the optical sheets and the mold frame shown in FIG. 17. In FIGS. 17 and 18, the same reference numerals denote the same elements in the above-described embodiments, and thus detailed descriptions of the same elements will be omitted.

Referring to FIGS. 17 and 18, a mold frame 700-4 includes a bottom mold 710 and a sidewall mold 720.

The bottom mold 710 includes a first bottom mold 711, a second bottom mold 712, and a third bottom mold 713. The first bottom mold 711 has a frame shape substantially parallel to the plane surface defined by the first direction DR1 and the second direction DR1. The first bottom mold 711 is overlapped with the non-display area NDA of the display panel 300. The optical sheets 500 may be placed on the first bottom mold 711.

The second bottom mold 712 is disposed on one end portion of the first bottom mold 711 in the second direction DR2. That is, a lower surface of the second bottom mold 712 is overlapped with a portion of the one end portion of the upper surface of the first bottom mold 711 in the second direction DR2.

A length of the second bottom mold 712 in the second direction DR2 may be shorter than a length of the first bottom mold 711 in the second direction DR2. When viewed in a plan view, the second bottom mold 712 is entirely overlapped with the first bottom mold 711.

The overlap area is defined to be placed at the one end portion of the first bottom mold 711 in the second direction DR2. That is, the second bottom mold 712 is disposed at the one end portion of the upper surface of the first bottom mold 711 in the second direction DR2. Accordingly, at least a portion of the upper surface of the first bottom mold 711 may be exposed by the second bottom mold 712. The exposed portion of the upper surface of the first bottom mold 711 is disposed at the other end portion of the first bottom mold 711 in the second direction DR2.

The third bottom mold 713 is disposed on one end portion of the second bottom mold 712 in the second direction DR2. A length of the third bottom mold 713 in the second direction DR2 may be shorter than the length of the second bottom mold 712 in the second direction DR2. When viewed in a plan view, the third bottom mold 713 is entirely overlapped with the second bottom mold 712.

The overlap area is defined to be placed at the one end portion of the second bottom mold 712 in the second direction DR2. That is, the third bottom mold 713 is disposed at the one end portion of the upper surface of the second bottom mold 712 in the second direction DR2. Accordingly, at least a portion of the upper surface of the second bottom mold 712 may be exposed by the third bottom mold 713. The exposed portion of the upper surface of the second bottom mold 712 is disposed at the other end portion of the second bottom mold 712 in the second direction DR2.

The first optical sheet 510 covers the upper surface of the first bottom mold 711, which is exposed by the second bottom mold 712 but does not cover the upper surface of the second bottom mold 712 and the third bottom mold 713.

The second optical sheet 520 covers the portion of the upper surface of the second bottom mold 712, which is exposed by the third bottom mold 713, and the upper surface of the first optical sheet 510. The second optical sheet 520 does not cover the upper surface of the third bottom mold 713.

The third optical sheet 530 covers the upper surface of the third bottom mold 713 and the upper surface of the second optical sheet 520.

The sidewall mold 720 is bent outwardly from the bottom mold 710 and extending upwardly. The upper surface of the sidewall mold 720 may be disposed on the same surface of the third optical sheet 530. Accordingly, the sidewall mold 720 may cover the first, second, and third optical sheets 510, 520, and 530.

The sidewall mold 720, the first bottom mold 711, the second bottom mold 712, and the third bottom 713 mold may be formed of the same material and be formed in one piece.

Although not shown in figures, according to another embodiment, the upper surface of the sidewall mold 720 may be disposed at a position higher than the upper surface of the third optical sheet 530. In this case, the sidewall mold 720 may cover not only the optical sheets 500, but also the display panel 300 and the polarizing layer 200.

Figure 19:
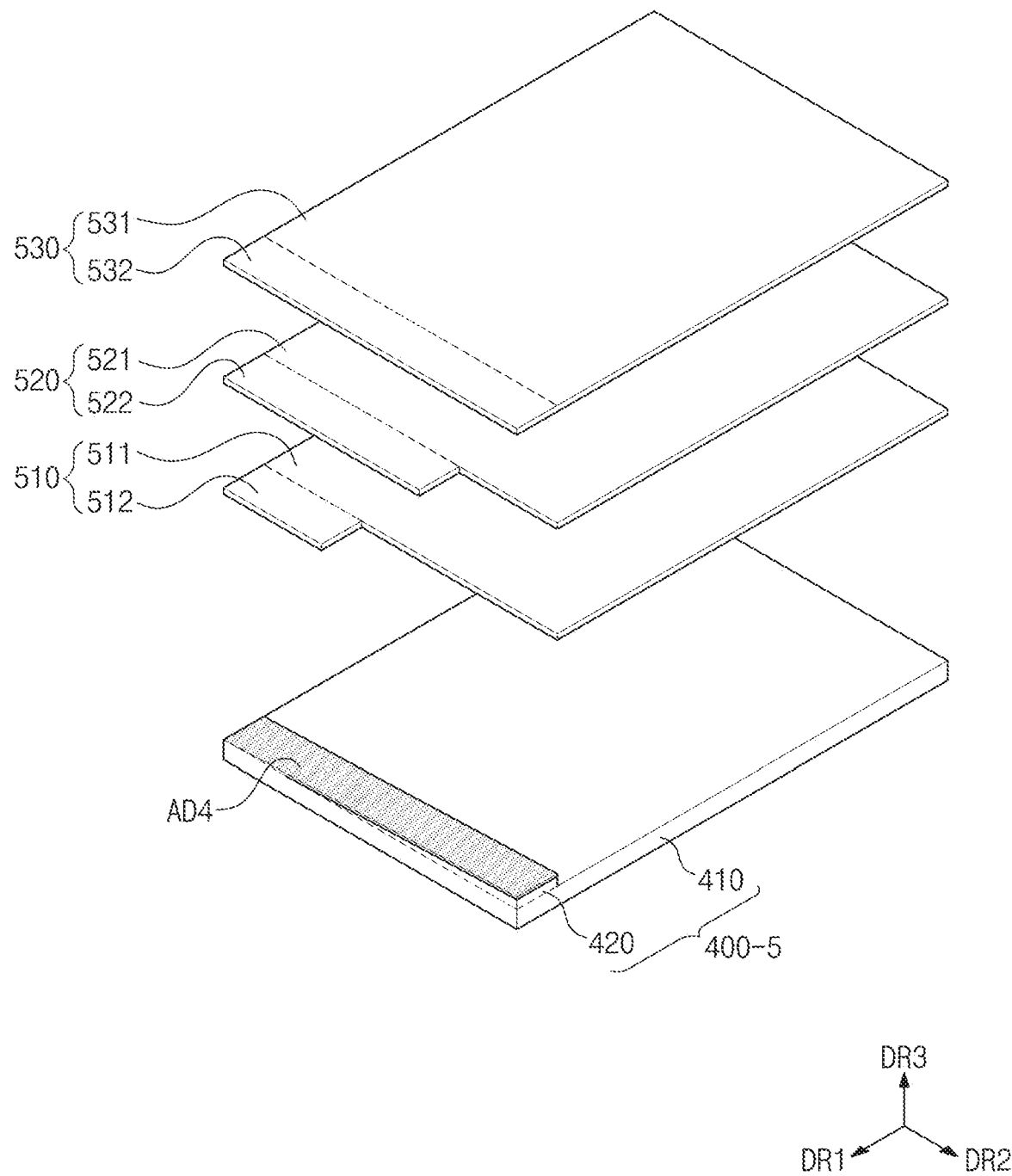
FIG. 19 is a perspective view showing optical sheets and a light guide plate according to another exemplary embodiment of the present disclosure.
Figure 20:
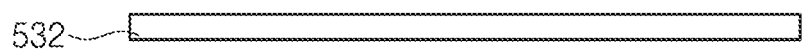
FIG. 20 is a cross-sectional view showing the optical sheets and the light guide plate shown in FIG. 19.
Figure 20:
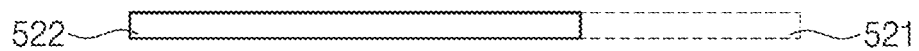
Figure 20:
Figure 20:
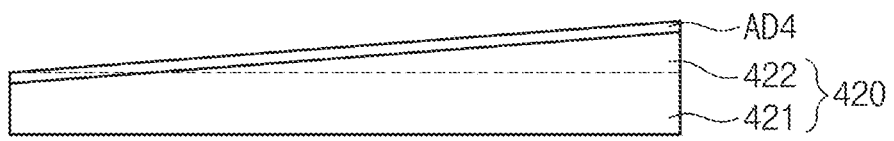
Figure 20:
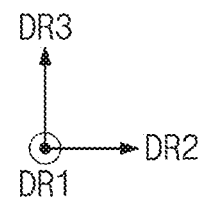

FIG. 19 is a perspective view showing optical sheets and a light guide plate according to another exemplary embodiment of the present disclosure, and FIG. 20 is a cross-sectional view showing the optical sheets and the light guide plate shown in FIG. 19.

In FIGS. 19 and 20, the same reference numerals denote the same elements in the above-described embodiments, and thus detailed descriptions of the same elements will be omitted.

Referring to FIGS. 19 and 20, an assembling portion 420 of a light guide plate 400-5 includes a first assembly 421 and a second assembly 422. A length of the first assembly 421 in the second direction DR2 may be equal to a length of a light guide plate 410 in the second direction DR2.

The first assembly 421 is connected to the one side surface of the light guide plate 410 and extends along the one side surface.

The second assembly 422 is disposed on the first assembly 421. The second assembly 422 may be disposed to be placed at one side portion of the first assembly 421 in the second direction DR2.

The upper surface of the second assembly 422 may be inclined along the second direction DR2. That is, the second assembly 422 may have a triangular shape in cross-section when viewed in the first direction DR1.

According to the present exemplary embodiment, the backlight unit may further include a fourth adhesive member AD4 disposed on an upper surface of the second assembly 422. The fourth adhesive member AD4 makes contact with an entire portion of a lower surface of a first wing portion 512, a portion of a lower surface of a second wing portion 522, and a portion of a lower surface of a third wing portion 532 to couple the first, second, and third wing portions 512, 522, and 532 to the second assembly 422.

According to the present exemplary embodiment, the portion of the upper surface of the first assembly 421 may be disposed at a position lower than the upper surface of the light guide portion 410. In detail, the portion of the upper surface of the first assembly 421 disposed at the other side portion in the second direction DR2 on the upper surface of the first assembly 421 may be disposed at the position lower than the light guide portion 410.

According to the present exemplary embodiment, the optical sheets 500 may be fixed by one adhesive member AD4. Thus, the assemblability of the display apparatus 1000 may be improved.

Figure 21:
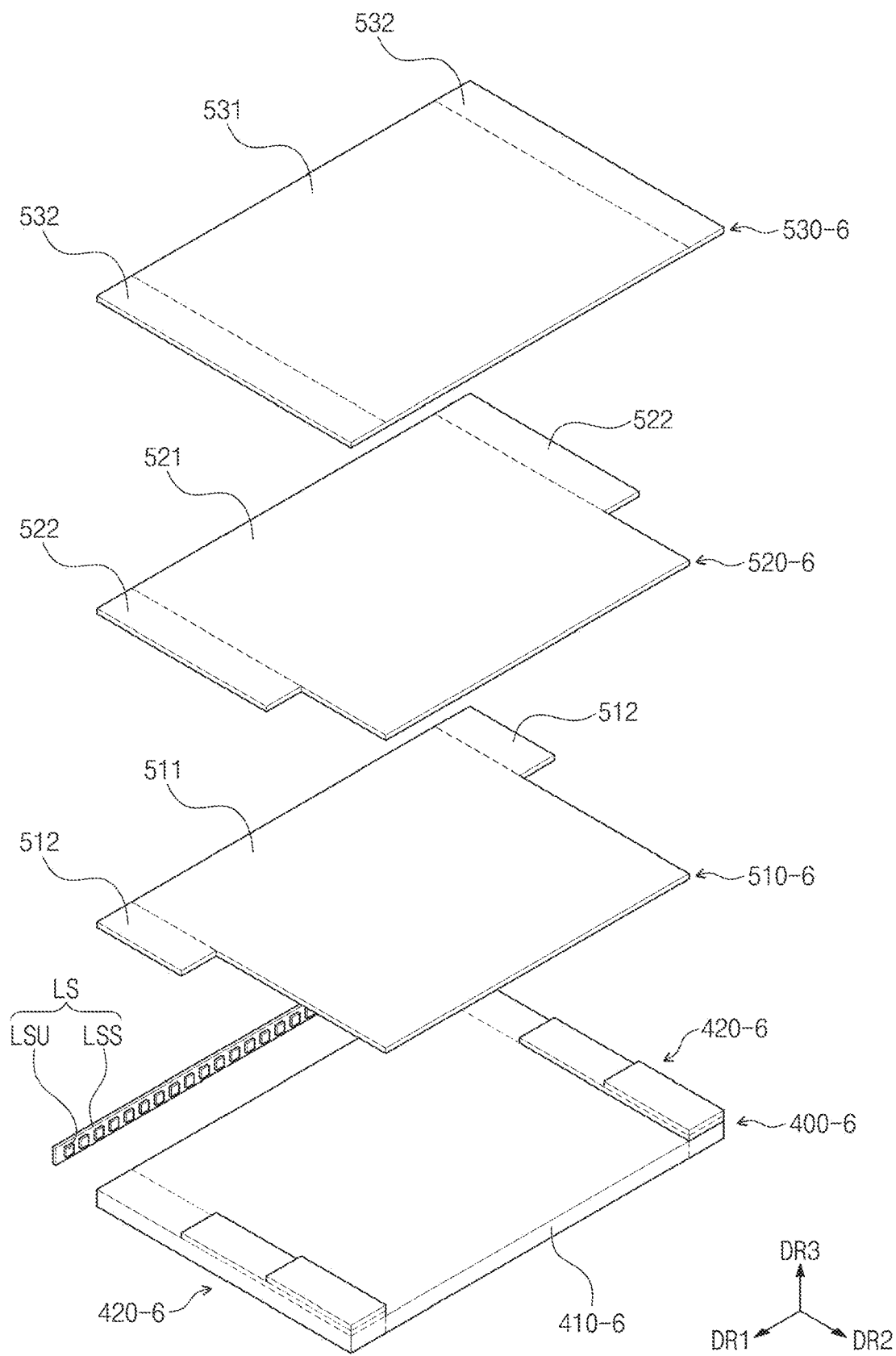
FIG. 21 is a perspective view showing optical sheets and a light guide plate according to another exemplary embodiment of the present disclosure.

FIG. 21 is a perspective view showing optical sheets and a light guide plate according to another exemplary embodiment of the present disclosure.

Referring to FIG. 21, a light guide plate 400-6 includes a light guide portion 410-6 and a plurality of assembling portions 420-6. FIG. 21 shows two assembling portions 420-6, but the number of the assembling portions 420-6 should not be limited to two.

The assembling portions 420-6 are connected to side surfaces of the light guide portion 410-6 which are opposite to each other in the first direction DR1. The light source LS is not disposed at the side surfaces of the light guide portion 410-6 which are apposite to each other to which the assembling portions 420-6 are connected. For instance, the light source LS may be disposed at one side surface which connects the side surfaces of the light guide portion 410-6 which are apposite to each other.

In the present exemplary embodiment, configurations of assemblies of each of the assembling portions 420-6 are the same as those described in FIGS. 3 and 4. Accordingly, the configuration of the assemblies of each of the assembling portions 420-6 will be omitted.

Optical sheets 500 according to the present exemplary embodiment include a first optical sheet 510-6, a second optical sheet 520-6, and a third optical sheet 530-6.

The first optical sheet 510-6 includes a first body portion 511 and a plurality of first wing portions 512. The first wing portions 512 are connected to opposite side portions of the first body portion 511 in the first direction DR1.

The second optical sheet 520-6 includes a second body portion 521 and a plurality of second wing portions 522. The second wing portions 522 are connected to opposite side portions of the second body portion 521 in the first direction DR1.

The third optical sheet 530-6 includes a third body portion 531 and a plurality of third wing portions 532. The third wing portions 532 are connected to opposite side portions of the third body portion 531 in the first direction DR1.

FIG. 21 shows two first, second, and third wing portions 512, 522, and 523 are respectively connected to the first, second, and third body portions 511, 521, and 531, but the number of each of the first, second, and third wing portions 512, 522, and 523 respectively connected to the first, second, and third body portions 511, 521, and 531 should not be limited to two.

In the present exemplary embodiment, a configuration of each of the first, second, and third wing portions 512, 522, and 532 is the same as the configuration of a corresponding wing portion among the wing portions 512, 522, and 532 described with reference to FIGS. 3 and 4. Accordingly, the configuration of each of the first, second, and third wing portions 512, 522, and 532 will be omitted.

Figure 22:
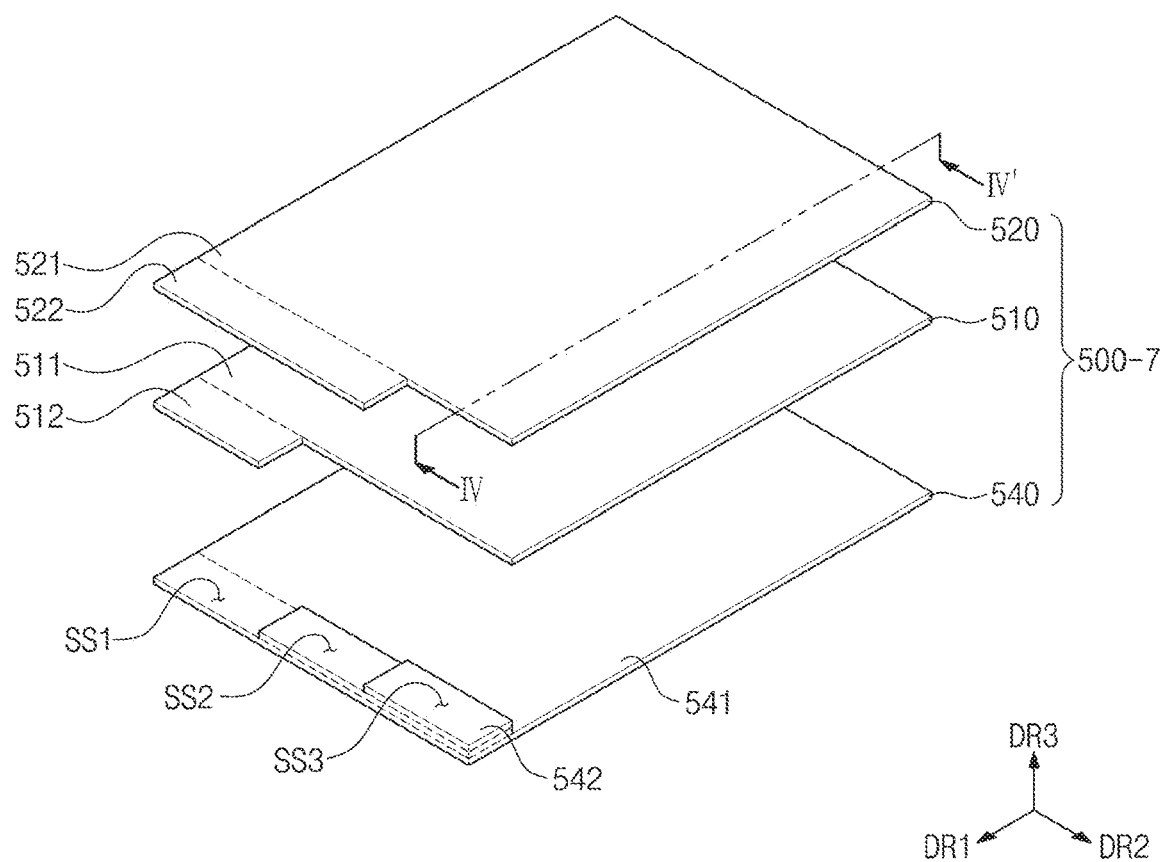
FIG. 22 is a perspective view showing optical sheets according to another exemplary embodiment of the present disclosure.
Figure 23:
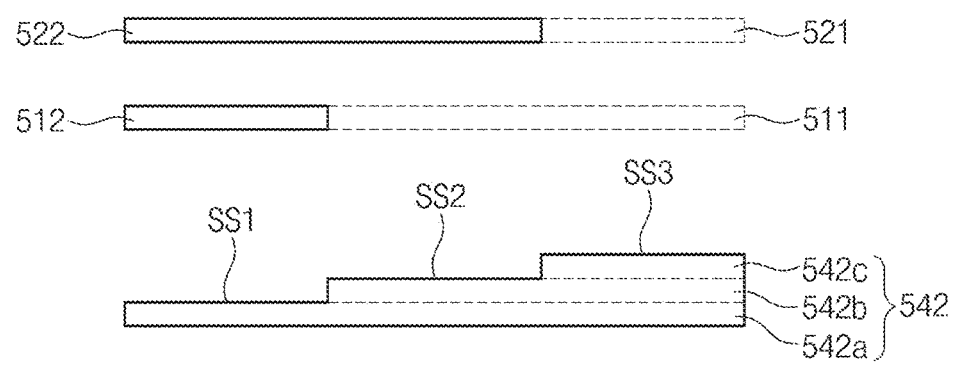
FIG. 23 is a cross-sectional view showing the optical sheets shown in FIG. 22.
Figure 23:
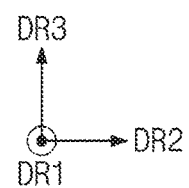
Figure 24:
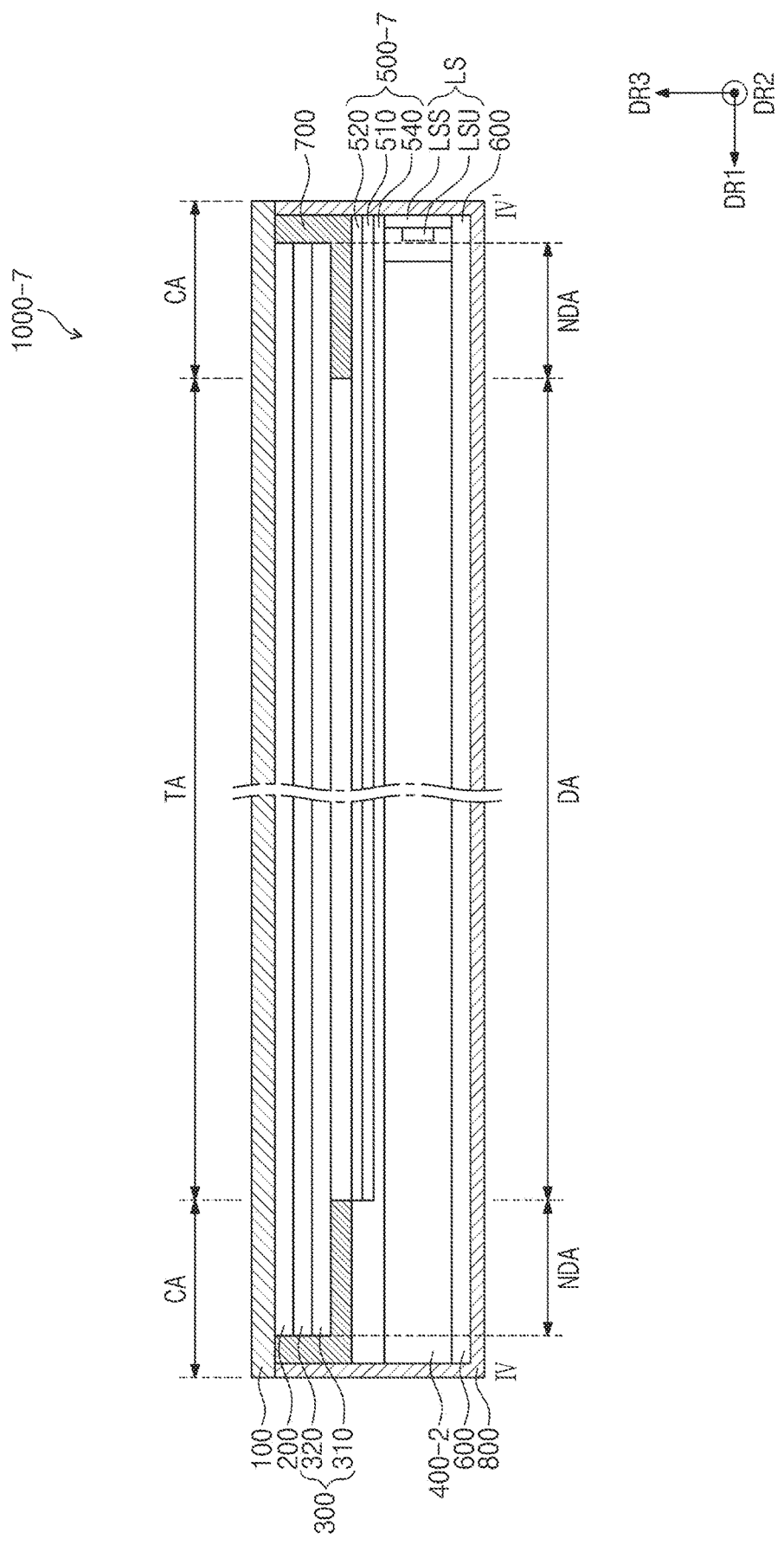
FIG. 24 is a cross-sectional view showing a display apparatus including the optical sheets shown in FIG. 22.

FIG. 22 is a perspective view showing optical sheets according to another exemplary embodiment of the present disclosure, FIG. 23 is a cross-sectional view showing the optical sheets shown in FIG. 22, and FIG. 24 is a cross-sectional view showing a display apparatus including the optical sheets shown in FIG. 22.

In FIGS. 22 to 24, the same reference numerals denote the same elements in the above-described embodiments, and thus detailed descriptions of the same elements will be omitted.

Optical sheets 500-7 include a first optical sheet 510, a second optical sheet 520, and a fourth optical sheet 540. The fourth optical sheet 540 may be disposed under the first optical sheet 510. The first and second optical sheets 510 and 520 are the same as the above-described embodiments, and thus details thereof will be omitted.

The fourth optical sheet 540 includes a fourth body portion 541 and a fourth wing portion 542. The fourth wing portion 542 is connected to one side portion of the fourth body portion 541 in the first direction DR1.

According to the present exemplary embodiment, the fourth wing portion 542 may have a step shape in cross-section. In detail, the fourth wing portion 542 includes a first base body 542a, a second base body 542b, and a third base body 542c. The first base body 542a, the second base body 542b, and the third base body 542c may be formed of the same material and be formed in one piece.

The first base body 542a is connected to one side portion of the fourth body portion 541 in the first direction DR1. A length in the second direction DR2 of the first base body 542a may be equal to a length in the second direction DR2 of the fourth body portion 541.

The second base body 542b is disposed on the first base body 542a. A length of the second base body 542b in the second direction DR2 is shorter than a length of the first base body 542a in the second direction DR2. The second base body 542b may be disposed on the upper surface of the first base body 542a to be placed at one end portion of the first base body 542a in the second direction DR2. At least a portion of the upper surface of the first base body 542a may be exposed by the second base body 542b. The exposed portion of the upper surface of the first base body 542a is referred to as a first support surface SS1. The first support surface SS1 is disposed at the other end portion of the upper surface of the first base body 542a in the second direction DR2.

The third base body 542c is disposed on the second base body 542b. A length of the third base body 542c in the second direction DR2 is shorter than the length of the second base body 542b in the second direction DR2. The third base body 542c may be disposed on the upper surface of the second base body 542b to be placed at one end portion of the second base body 542b in the second direction DR2. At least a portion of the upper surface of the second base body 542b may be exposed by the third base body 542c. The exposed portion of the upper surface of the second base body 542b is referred to as a second support surface SS2. The second support surface SS2 is disposed at the other end portion of the upper surface of the second base body 542b in the second direction DR2. The upper surface of the third base body 542c is referred to as a third support surface SS3.

The first optical sheet 510 is disposed on the fourth optical sheet 540. The first body portion 511 covers an upper surface of the fourth body portion 541, and the first wing portion 512 covers the first support surface SS1 of the fourth wing portion 542 but does not cover the second support surface SS2 and the third support surface SS3.

A step difference between the first support surface SS1 and the second support surface SS2 may be equal to a thickness of the first optical sheet 510. Accordingly, the upper surface of the first optical sheet 510 may be disposed on the same plane surface as the second support surface SS2.

The second optical sheet 520 is disposed on the first optical sheet 510. The second body portion 521 covers the upper surface of the first body portion 511, and the second wing portion 522 covers the upper surface of the first wing portion 512 and the second support surface SS2 but does not covers the third support surface SS3.

A step difference between the second support surface SS2 and the third support surface SS3 may be equal to a thickness of the second optical sheet 520. Accordingly, the upper surface of the second optical sheet 520 may be disposed on the same plane surface as the third support surface SS3.

Although not shown in figures, according to another embodiment, the third optical sheet may be disposed above the second optical sheet 520. The third optical sheet may have the same configuration as that of the third optical sheet 530 described above. The third optical sheet may cover the upper surface of the second optical sheet 520 and the third support surface SS3.

Figure 25:
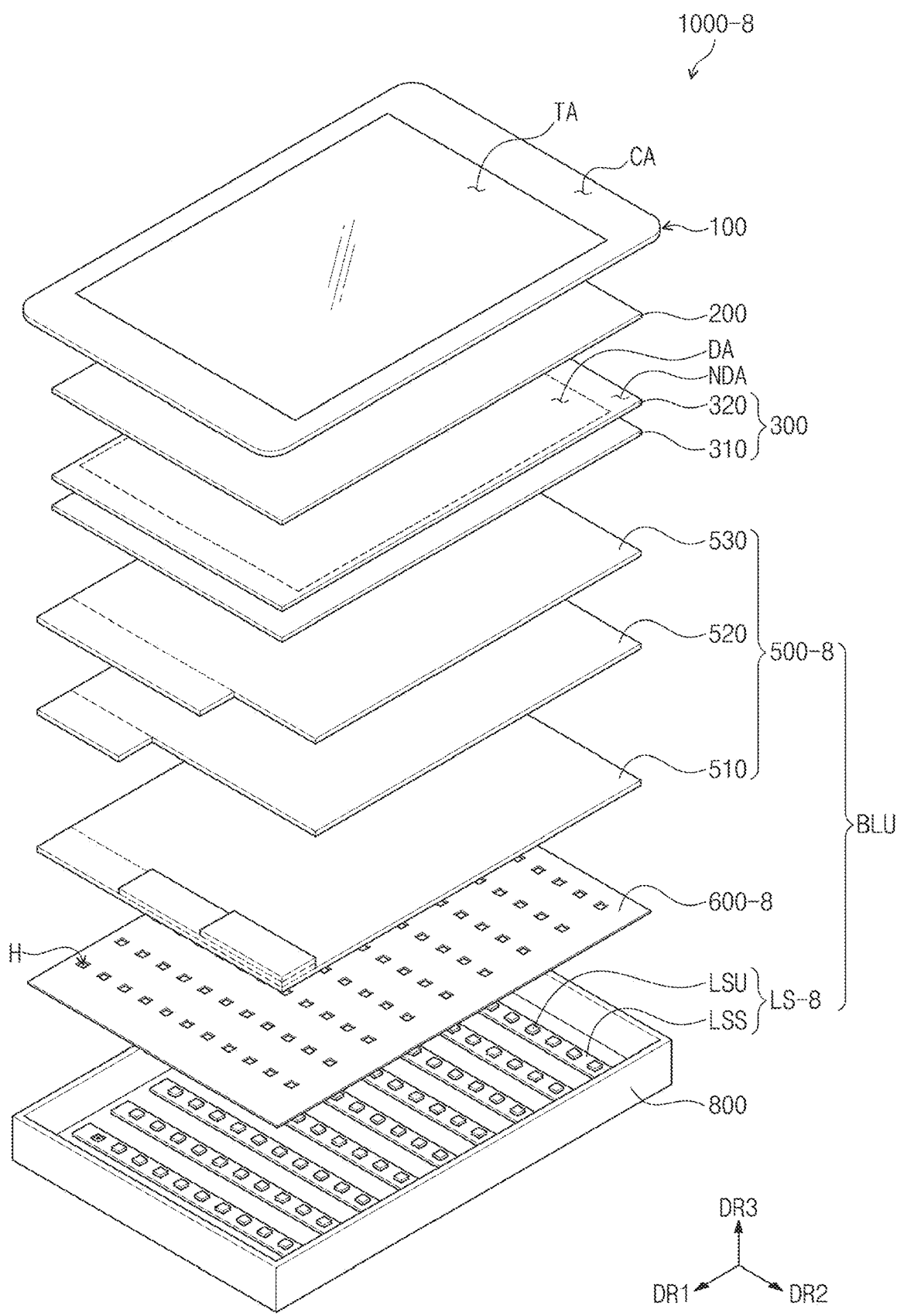
FIG. 25 is an exploded perspective view showing a display apparatus according to another exemplary embodiment of the present disclosure.

FIG. 25 is an exploded perspective view showing a display apparatus according to another exemplary embodiment of the present disclosure. In FIG. 25, the same reference numerals denote the same elements in the above-described embodiments, and thus detailed descriptions of the same elements will be omitted.

Referring to FIG. 25, a backlight unit according to the present exemplary embodiment may be a direct-illumination type backlight unit.

In detail, the backlight unit BLU includes a light source LS-8, a plurality of optical sheets 500-8, and a reflective sheet 600-8.

The light source LS includes a plurality of light source units LSU and light source substrates LSS on which the light source units LSU are mounted. The light source substrates LSS extend in the second direction DR2 and are arranged in the first direction DR1. The light source units LSU mounted on each of the light source substrates LSS may be arranged in the second direction DR2.

The reflective sheet 600-8 is disposed above the light source LS. The reflective sheet 600-8 may include a plurality of holes H formed therethrough. Each of the light source units LSU mounted on the light source substrates LSS may be inserted into a correspond hole H of the reflective sheet 600-8.

The optical sheets 500-8 have the same structure and function as those of the optical sheets 500-7 shown in FIGS. 22 to 24, and thus details thereof will be omitted. For instance, a display apparatus according to another embodiment of the present disclosure may further include a mold frame as shown in FIGS. 14 to 18, and thus the optical sheets 500-8 may be coupled to the mold frame by the shape of the bottom mold of the mold frame.

Figure 26:
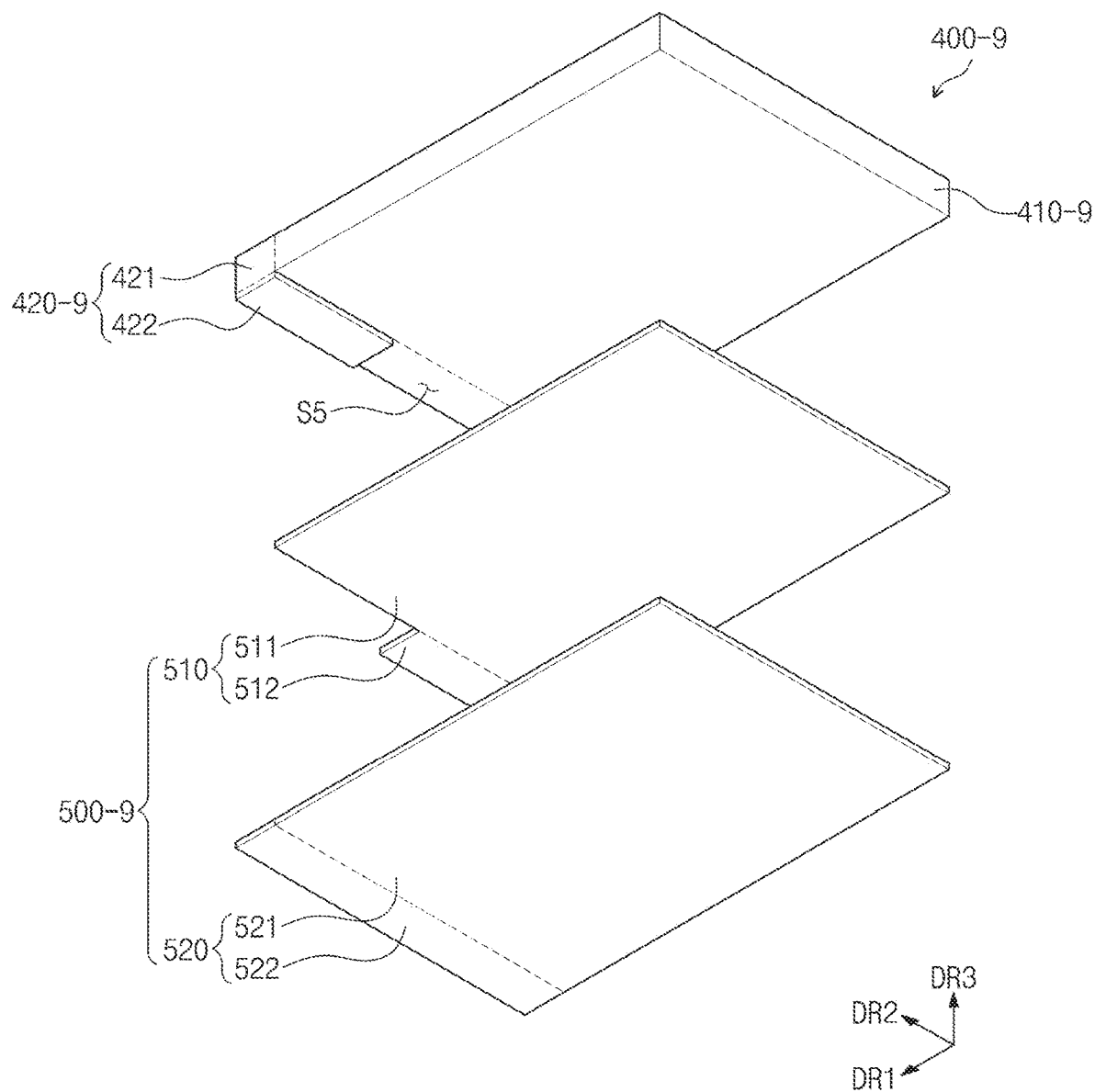
FIG. 26 is a perspective view showing a light guide plate and optical sheets according to another exemplary embodiment of the present disclosure.

FIG. 26 is a perspective view showing a light guide plate 400-9 and optical sheets according to another exemplary embodiment of the present disclosure. In FIG. 26, the same reference numerals denote the same elements in the above-described embodiments, and thus detailed descriptions of the same elements will be omitted.

Referring to FIG. 26, the light guide plate 400-9 according to the present exemplary embodiment includes a light guide portion 410-9 and an assembling portion 420-9. The light guide portion 410-9 has the same structure and function as those of the above-described light guide portion 410, and thus details thereof will be omitted.

The assembling portion 420-9 includes a first assembly 421 and a second assembly 422. The first assembly 421 is disposed at one side portion of the light guide portion 410-9 in the first direction DR1. A thickness in the third direction DR3 of the first assembly 421 is equal to a thickness in the third direction DR3 of the light guide portion 410-9. A lower surface of the first assembly 421 may be disposed on the same plane surface of a lower surface of the light guide portion 410-9.

The second assembly 422 is disposed under the first assembly 421. A length of the second assembly 422 in the second direction DR2 is shorter than a length of the first assembly 421 in the second direction DR2. The second assembly 422 may be disposed to be placed at one end portion of the first assembly 421 in the second direction DR2. At least a portion of the lower surface of the first assembly 421 may be exposed by the second assembly 422. The exposed portion of the lower surface of the first assembly 421 is referred to as a fifth support surface S5. The fifth support surface S5 is disposed at the other end portion of the lower surface of the first assembly 421 in the second direction DR2.

In the present exemplary embodiment, the fifth support surface S5 may correspond to a half (½) of an entire area of the lower surface of the first assembly 421. That is, a length in the second direction DR2 of the second assembly 422 may correspond to a half (½) of a length of the first assembly 421 in the second direction DR2.

The first optical sheet 510 is disposed under the light guide plate 400-9. A first body portion 511 of the first optical sheet 510 may cover the lower surface of the light guide portion 410-9, and a first wing portion 512 of the first optical sheet 510 may cover the fifth support surface S5 but does not cover the second assembly 422.

A step difference between the fifth support surface S5 and the second assembly 422 may be equal to a thickness of the first optical sheet 510. Accordingly, the lower surface of the first optical sheet 510 may be disposed on the same plane surface of a lower surface of the second assembly 422.

The second optical sheet 520 is disposed under the first optical sheet 510. A second body portion 521 of the second optical sheet 520 may cover the lower surface of the first body portion 511, and a second wing portion 522 of the second optical sheet 520 may cover the lower surface of the first wing portion 512 and the lower surface of the second assembly 422.

According to the present exemplary embodiment, at least one of the first optical sheet 510 and the second optical sheet 520 may serve as a reflective sheet. To this end, at least one of the first optical sheet 510 and the second optical sheet 520 may include a reflective material.

Consequently, according to the present exemplary embodiment, the optical sheets 500-9 may be effectively prevented from moving. In addition, the assemblability of the optical sheets 500-9 may be improved.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A display apparatus comprising:
   a light source generating light;
   a display panel receiving the light from the light source and comprising a display area displaying an image and a non-display area disposed adjacent to the display area, the display area and the non-display area being defined on a plane surface defined by a first direction and a second direction crossing the first direction;

a first optical sheet and a second optical sheet disposed under the display panel; and a light guide plate disposed under the first optical sheet and the second optical sheet, wherein each of the first optical sheet and the second optical sheet comprising:

a body portion overlapped with the display area; and a wing portion connected to one side portion of the body portion in the first direction to overlap with a portion of the non-display area, wherein a length of the wing portion of the first optical sheet in the second direction is shorter than a length of the wing portion of the second optical sheet in the second direction, and the wing portion of the first optical sheet is entirely overlapped with the wing portion of the second optical sheet; and wherein the light guide plate is formed of a same material and formed in one piece, the light guide plate comprising:

a light guide portion overlapped with the display area; and an assembling portion connected to one side surface of the light guide portion in the first direction and overlapped with the wing portion.

2. The display apparatus of claim 1, wherein the first optical sheet is disposed between the light guide plate and the second optical sheet.

3. The display apparatus of claim 2, wherein the assembling portion comprises:

a first assembly connected to the one side surface of the light guide portion; and a second assembly disposed above the first assembly and having a length shorter than a length of the first assembly in the second direction to expose at least a portion of an upper surface of the first assembly.

4. The display apparatus of claim 3, wherein the light guide portion comprises:

a light exit surface making contact with a lower surface of the body portion of the first optical sheet;

a bottom surface facing the light exit surface; and a plurality of side surfaces connecting the light exit surface and the bottom surface, the side surfaces comprise:

a light incident surface facing the light source to receive the light from the light source;

an opposite surface facing the light incident surface;

a first side surface connecting the light incident surface and the light exit surface; and a second side surface connecting the light incident surface and the light exit surface, and wherein the first assembly is connected to at least one of the opposite surface, the first side surface, or the second side surface.

5. The display apparatus of claim 3, further comprising a third optical sheet disposed between the display panel and the second optical sheet, wherein the assembling portion further comprises a third assembly disposed on the second assembly and having a length shorter than the length of the second assembly in the second direction, and a portion of an upper surface of the second assembly is exposed by the third assembly.

6. The display apparatus of claim 5, wherein the portion of the upper surface of the first assembly is defined as a first support surface, the wing portion of the first optical sheet covers the first support surface, the portion of the upper surface of the second assembly is defined as a second support surface, the wing portion of the second optical sheet covers the second support surface and an upper surface of the wing portion of the first optical sheet, and the wing portion of the third optical sheet covers an upper surface of the third assembly and an upper surface of the wing portion of the second optical sheet.

7. The display apparatus of claim 6, wherein the upper surface of the first assembly is disposed on a same plane surface as an upper surface of the light guide portion.

8. The display apparatus of claim 6, further comprising:

a first adhesive member disposed on the first support surface to fix the first optical sheet to the first assembly;

a second adhesive member disposed on the second support surface to fix the second optical sheet to the second assembly; and a third adhesive member disposed on a third support surface to fix the third optical sheet to the third assembly.

9. The display apparatus of claim 8, wherein a plane surface defined by the first support surface has a step difference with respect to a plane surface defined by the upper surface of the light guide portion, and the step difference is equal to a thickness of the first adhesive member.

10. The display apparatus of claim 2, wherein an upper surface of the assembling portion is inclined along the second direction.

11. The display apparatus of claim 10, further comprising an adhesive member disposed on an inclined upper surface of the assembling portion, wherein the adhesive member fixes a lower surface of the wing portion of the first optical sheet and a lower surface of the wing portion of the second optical sheet to the inclined upper surface of the assembling portion.

12. The display apparatus of claim 1, further comprising an adhesive structure coupling the first optical sheet and the second optical sheet to the light guide plate, wherein the adhesive structure comprises:

a first base body disposed on an upper surface of the assembling portion; and a second base body disposed on the first base body and having a length shorter than a length of the first base body in the second direction to expose at least a portion of an upper surface of the first base body.

13. The display apparatus of claim 1, further comprising a mold frame disposed under the first optical sheet and the second optical sheet and overlapped with the non-display area, wherein the mold frame comprises:

a first bottom mold substantially parallel to the plane surface defined by the first and second directions and having a frame shape;

a second bottom mold disposed at one end portion of the first bottom mold in the first direction and having a length shorter than a length of one side portion of the first bottom mold in the second direction; and a sidewall mold extending upwardly to cover side surfaces of the first optical sheet and the second optical sheet, and wherein a portion of an upper surface of the first bottom mold is exposed by the second bottom mold.

14. The display apparatus of claim 13, wherein the first optical sheet is disposed between the mold frame and the second optical sheet, a lower surface of the wing portion of the first optical sheet makes contact with the portion of the upper surface of the first bottom mold, and the wing portion of the second optical sheet makes contact with an upper surface of the wing portion of the first optical sheet and an upper surface of the second bottom mold.

15. The display apparatus of claim 1, wherein the first optical sheet is disposed between the display panel and the second optical sheet.

16. The display apparatus of claim 15, further comprising a mold frame disposed between the display panel and the first optical sheet and having a frame shape overlapped with the non-display area,
wherein the mold frame comprises:
a first bottom mold extending parallel to the plane surface defined by the first direction and the second direction;
a second bottom mold disposed under one end portion of the first bottom mold in the first direction and having a length shorter than a length of the one end portion of the first bottom mold in the second direction; and
a sidewall mold extending downwardly to cover side surfaces of the first optical sheet and the second optical sheet, and
wherein a portion of a lower surface of the first bottom mold is exposed by the second bottom mold.

17. The display apparatus of claim 16, wherein an upper surface of the wing portion of the first optical sheet makes contact with the portion of the lower surface of the first bottom mold, and the wing portion of the second optical sheet makes contact with a lower surface of the wing portion of the first optical sheet and a lower surface of the second bottom mold.

18. The display apparatus of claim 15, wherein the assembling portion comprises:
a first assembly connected to the one side surface of the light guide portion; and
a second assembly disposed under the first assembly and having a length shorter than a length of the first assembly in the second direction to expose at least a portion of a lower surface of the first assembly.

19. The display apparatus of claim 1, wherein at least one of the first optical sheet and the second optical sheet comprises a reflective material.

20. A display apparatus comprising:
a light source generating light;
a display panel comprising a display area displaying an image and a non-display area surrounding the display area;
a first optical sheet disposed under the display panel;
a second optical sheet disposed between the first optical sheet and the display panel; and
a light guide plate disposed under the first optical sheet and the second optical sheet,
wherein each of the first and second optical sheets comprising:
a body portion overlapped with the display area; and
a plurality of wing portions respectively connected to two or more outer side portions of the body portion to overlap with a portion of the non-display area;
wherein the light guide plate is formed of a same material and formed in one piece, the light guide plate comprising:
a light guide portion overlapped with the display area; and
a plurality of assembling portions connected to at least two side surfaces of the light guide portion and overlapped with the plurality of wing portions,
wherein a length of portions in which each of the wing portions of the first optical sheet is connected to the body portion of the first optical sheet is shorter than a length of portions in which each of the wing portions of the second optical sheet is connected to the body portion of the second optical sheet, and
wherein the wing portions of the first optical sheet are entirely overlapped with the wing portions of the second optical sheet, respectively.

21. The display apparatus of claim 20, wherein each of the assembling portions comprises:
a first assembly connected to one side surface of the light guide portion; and
a second assembly connected to the one side surface of the light guide portion and disposed on the first assembly and having a length shorter than a length of the first assembly, a portion of an upper surface of the first assemblies is exposed by the second assemblies, and
wherein a lower surface of each of the wing portions of the first optical sheet makes contact with the portion of the upper surface of the first assembly, and a lower surface of each of the wing portions of the second optical sheet covers an upper surface of the wing portions of the first optical sheet and an upper surface of the second assembly.

22. The display apparatus of claim 21, wherein the light guide plate comprises:
a light exit surface making contact with a lower surface of the body portion of the first optical sheet;
a bottom surface facing the light exit surface; and
a plurality of side surfaces connecting the light exit surface and the bottom surface, the side surfaces comprise:
a light incident surface on which the light source is arranged;
an opposite surface facing the light incident surface;
a first side surface connecting the light incident surface and the light exit surface; and
a second side surface connecting the light incident surface and the light exit surface to face the first side surface, and
wherein each of the first assemblies is connected to at least one of the opposite surface, the first side surface, and the second side surface.

* * * * *